United States Patent
Hao et al.

(10) Patent No.: US 12,246,606 B2
(45) Date of Patent: Mar. 11, 2025

(54) MULTI-FUNCTION DC-DC CONVERTER FOR BATTERY ELECTRIC VEHICLES

(71) Applicant: GM GLOBAL TECHNOLOGY OPERATIONS LLC, Detroit, MI (US)

(72) Inventors: Lei Hao, Troy, MI (US); Chandra S. Namuduri, Troy, MI (US); Chengwu Duan, Shanghai (CN); Suresh Gopalakrishnan, Troy, MI (US); Neeraj S. Shidore, Novi, MI (US); Venkata Prasad Atluri, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 751 days.

(21) Appl. No.: 17/550,004

(22) Filed: Dec. 14, 2021

(65) Prior Publication Data

US 2023/0150378 A1   May 18, 2023

(30) Foreign Application Priority Data

Nov. 12, 2021   (CN) .......................... 202111338996.3

(51) Int. Cl.
*B60L 53/20*   (2019.01)
*B60L 53/16*   (2019.01)
(Continued)

(52) U.S. Cl.
CPC .............. *B60L 53/20* (2019.02); *B60L 53/16* (2019.02); *H02J 7/0013* (2013.01);
(Continued)

(58) Field of Classification Search
CPC ....................................................... B60L 53/20
(Continued)

(56) References Cited

U.S. PATENT DOCUMENTS 9,387,766 B2   7/2016   Hao et al.
10,110,103 B1   10/2018   Hao et al.
(Continued)

FOREIGN PATENT DOCUMENTS

DE   102013218228 A1   3/2015
DE   102013021256 A1   6/2015
(Continued)

OTHER PUBLICATIONS

U.S. Appl. No. 16/945,123, filed Jul. 31, 2020, Hao et al.
(Continued)

*Primary Examiner* — Jerry D Robbins

(57) ABSTRACT

A power control system for a vehicle includes a charge port and a contactor connected to the charge port and including a first plurality of switches. An energy storage system includes a second plurality of switches and one or more battery packs. A bi-directional DC-DC converter is connected between the energy storage system and a plurality of vehicle loads. A controller is configured to control states of the first and second plurality of switches to configure in a plurality of modes including a range improvement mode, a first charging mode to perform charging at a first voltage level, a second charging mode to perform charging at a second voltage level, a battery preconditioning mode; and an accessory load support mode.

20 Claims, 28 Drawing Sheets

(51) Int. Cl.
*H02J 7/00* (2006.01)
*H02M 3/158* (2006.01)

(52) U.S. Cl.
CPC ........... *H02J 7/0042* (2013.01); *H02M 3/158* (2013.01); *B60L 2210/10* (2013.01); *H02J 2207/20* (2020.01); *H02J 2207/40* (2020.01)

(58) Field of Classification Search
USPC ........................................................ 320/104
See application file for complete search history.

(56) References Cited

U.S. PATENT DOCUMENTS

| | | | |
|---|---|---|---|
| 10,974,717 | B2 | 4/2021 | Golgiri et al. |
| 2009/0167217 | A1 | 7/2009 | Soma et al. |
| 2011/0187184 | A1* | 8/2011 | Ichikawa ................ B60L 55/00 307/10.1 |
| 2017/0136881 | A1 | 5/2017 | Ricci |
| 2019/0097436 | A1* | 3/2019 | Ing ........................ B60L 3/0007 |
| 2019/0100111 | A1* | 4/2019 | Liu ........................ B60R 16/033 |
| 2020/0298722 | A1* | 9/2020 | Smolenaers ............ H02J 7/345 |
| 2020/0298725 | A1 | 9/2020 | Shin et al. |
| 2020/0384977 | A1 | 12/2020 | Higuchi et al. |
| 2021/0155100 | A1* | 5/2021 | Khaligh .................. B60L 55/00 |

FOREIGN PATENT DOCUMENTS

| | | |
|---|---|---|
| DE | 102014205977 A1 | 10/2015 |
| DE | 102016105393 A1 | 10/2016 |
| DE | 202012013408 U1 | 12/2016 |
| DE | 102015219850 A1 | 4/2017 |
| DE | 102017114339 A1 | 1/2019 |
| DE | 102017212435 A1 | 1/2019 |
| DE | 102018207183 A1 | 11/2019 |
| DE | 102018207185 A1 | 11/2019 |
| DE | 102020103574 A1 | 1/2021 |
| EP | 3126182 B1 | 11/2018 |

OTHER PUBLICATIONS

U.S. Appl. No. 17/038,603, filed Sep. 30, 2020, Shidore et al.
Office Action dated May 2, 2022 from German Patent Office for German Patent Application No. 102021131709.6; 18 Pages.

* cited by examiner

| Mode | S1 | S2 | S3 | S4 | S5 | S6 | S9 | S10 | SPC | DBB |
|---|---|---|---|---|---|---|---|---|---|---|
| Normal Driving | On | Off | On | Off | On | On | On | On | Off | Off |
| Range improvement | Off | On | Off | Off | On | On | On | On | Off | On |
| Pre-charging | On | On | Off | Off | Off | On | Off | Off | On | Off |
| Charging from 400V grid | On | Off | On | On | On | On | Off | Off | Off | Off |
| Charging from 800V grid | Off | Off | On | On | On | On | Off | Off | Off | On |
| Charging second vehicle 400V ESS | Off | Off | Off | On | On | On | Off | Off | Off | On |
| Charging second vehicle 800V ESS | Off | Off | On | Off | On | On | Off | Off | Off | On |
| Battery Preconditioning | Off | Off | Off | Off | On | On | Off | Off | Off | On |

FIG. 2A

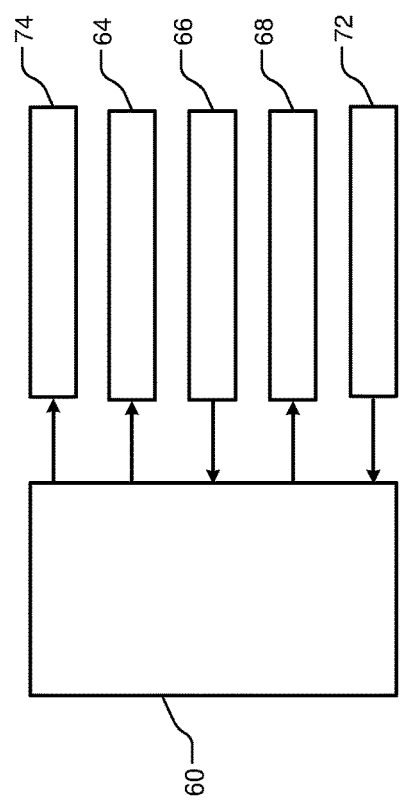

FIG. 3

| Mode | S1 | S2 | S3 | S4 | S5 | S6 | S7 | S8 | S9 | S10 | SPC | DBB |
|---|---|---|---|---|---|---|---|---|---|---|---|---|
| Normal Driving | On | Off | On | Off | On | On | On | On | Off | On | Off | Off |
| Range improvement | On | Off | On | Off | On | On | On | On | On | Off | Off | On |
| Pre-charging | On | On | Off | Off | Off | On | Off | Off | On | Off | On | Off |
| Charging from 400V grid | On | On | Off | On | Off | On | On | Off | On | On | Off | On |
| Charging from 800V grid | On | Off | On | Off | On | On | On | Off | Off | On | Off | On |
| Charging second vehicle 400V ESS | Off | Off | On | Off | On | On | On | On | Off | Off | Off | On |
| Battery Preconditioning | On | Off | On | Off | On | On | On | On | Off | Off | Off | On |

FIG. 5A

| Mode | S1 | S2 | S3 | S4 | S5 | S6 | S10 | S11 | S12 | SPC | DBB |
|---|---|---|---|---|---|---|---|---|---|---|---|
| Normal Driving | On | Off | On | Off | On | On | Off | Off | On | Off | On |
| Accessory Load Support | Off | Off | Off | Off | On | On | On | On | On | Off | On |
| Range improvement | Off | On | Off | Off | Off | On | On | Off | Off | Off | On |
| Pre-charging | On | On | On | On | On | On | On | On | On | On | Off |
| Charging from 400V grid | Off | On | On | Off | On | On | On | On | On | Off | On |
| Charging from 800V grid | On | Off | On | On | On | On | Off | Off | On | Off | On |
| Charging second vehicle 400V ESS | Off | Off | On | On | On | On | On | On | Off | Off | On |
| Charging second vehicle 800V ESS | Off | Off | Off | Off | Off | On | Off | Off | Off | Off | On |
| Battery Preconditioning | Off | Off | Off | Off | On | On | Off | Off | Off | Off | On |

FIG. 7

| Mode | S1 | S2 | S3 | S4 | S5 | S6 | S7 | S8 | S9 | S10 | S11 | S12 | SPC | DBB |
|---|---|---|---|---|---|---|---|---|---|---|---|---|---|---|
| Normal Driving | On | Off | On | Off | Off | On | On | Off | On | Off | Off | On | Off | On |
| Accessory Load Support | Off | Off | Off | Off | Off | On | On | Off | On | On | On | On | Off | On |
| Range improvement | Off | Off | Off | Off | Off | On | Off | Off | On | Off | Off | Off | On | Off |
| Pre-charging | Off | Off | On | On | Off | On | On | Off | On | On | On | On | Off | On |
| Charging from 400V grid | On | Off | On | Off | Off | On | On | Off | On | Off | On | On | Off | On |
| Charging from 800V grid | Off | On | On | On | Off | On | On | Off | On | On | On | On | Off | On |
| Charging second vehicle 400V ESS | Off | Off | Off | Off | Off | On | On | Off | On | On | On | Off | Off | On |
| Charging second vehicle 800V ESS | Off | Off | Off | Off | Off | On | On | Off | On | Off | Off | Off | Off | On |
| Battery Preconditioning | Off | Off | Off | Off | Off | On | On | Off | On | Off | Off | Off | Off | On |

FIG. 9

| Mode | S1 | S2 | S3 | S4 | S5 | S6 | S7 | S8 | SPC | Conv |
|---|---|---|---|---|---|---|---|---|---|---|
| Normal Driving | On | Off | On | Off | On | On | Off | Off | Off | On |
| Range improvement | Off | Off | Off | Off | On | On | On | On | Off | On |
| Accessory Load Support | Off | On | Off | Off | Off | On | Off | Off | On | Off |
| Pre-charging | On | Off | On | On | On | On | On | On | Off | On |
| Charging from 400V grid | Off | On | Off | On | On | On | Off | Off | Off | Off |
| Charging from 800V grid | On | Off | On | Off | On | On | Off | On | Off | On |
| Charging second vehicle 400V ESS | Off | Off | Off | Off | On | On | Off | Off | Off | On |
| Battery Preconditioning | Off | Off | Off | Off | On | On | Off | Off | Off | On |

FIG. 12

| Mode | S1 | S2 | S3 | S4 | S5 | S6 | S7 | S8 | S9 | S10 | S11 | SPC | Conv |
|---|---|---|---|---|---|---|---|---|---|---|---|---|---|
| Normal Driving | On | Off | On | Off | Off | On | On | Off | On | Off | Off | Off | On |
| Range improvement | Off | Off | Off | Off | Off | On | On | Off | On | On | On | Off | On |
| Accessory Load Support | Off | Off | Off | Off | Off | On | Off | Off | On | On | Off | On | On |
| Pre-charging | Off | On | On | On | Off | On | On | Off | On | Off | Off | Off | Off |
| Charging from 400V grid | Off | Off | On | Off | Off | On | On | Off | On | Off | On | Off | On |
| Charging from 800V grid | On | Off | Off | Off | Off | On | On | Off | On | Off | Off | Off | On |
| Charging second vehicle 400V ESS | Off | Off | Off | Off | Off | On | On | Off | On | On | Off | Off | Off |
| Battery Preconditioning | Off | Off | Off | Off | Off | On | On | Off | On | Off | Off | Off | On |

FIG. 14

MULTI-FUNCTION DC-DC CONVERTER FOR BATTERY ELECTRIC VEHICLES

CROSS-REFERENCE TO RELATED APPLICATIONS

This application claims the benefit of Chinese Patent Application No. 202111338996.3, filed on Nov. 12, 2021. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery systems and more particularly to a power control system for battery systems for battery electric vehicles (BEVs) including DC-DC converters.

Battery electric vehicles (BEVs) include one or more battery packs each including one or more battery cells. A battery system is used to control charging and discharging of the battery. During operation, one or more electric motors of the BEV are used to provide propulsion for the vehicle. Some BEVs allow a driver to select different modes of operation that may include a sport mode, a normal mode and a range improvement mode.

The power stored by the battery pack(s) is depleted after usage and the BEV needs to be recharged. Options for recharging the battery pack(s) include plugging into utility power at a charging station such as a commercial charging station or a home charging station. Other options may include charging one BEV using the power stored in another BEV.

As can be appreciated, the battery pack of the BEV may be depleted while the vehicle is not at the home of the owner. Currently, the amount of time that is required to fully recharge the battery pack(s) is typically on the order of 4-12 hours for a full charge depending upon various factors. The charging period is significantly longer than the amount of time that is required to fill a fuel tank of a vehicle including an internal combustion engine (less than 10 minutes).

Some BEV(s) have adopted higher voltage battery systems for charging the battery pack(s) more quickly in an effort to reduce charging times. For example, some fast charging systems can charge the battery pack to 80% capacity in less than one hour. Prior to initiating recharging, some of these charging systems may perform battery pre-conditioning such as heating the battery pack(s) to a predetermined temperature to improve charging efficiency.

SUMMARY

A power control system for a vehicle includes a charge port and a contactor connected to the charge port and including a first plurality of switches. An energy storage system includes a second plurality of switches and one or more battery packs. A bi-directional DC-DC converter is connected between the energy storage system and a plurality of vehicle loads. A controller is configured to control states of the first plurality of switches and the second plurality of switches to configure in a plurality of modes including a range improvement mode; a first charging mode to perform charging at a first voltage level, wherein the one or more battery packs supply power at the first voltage level; a vehicle to vehicle charging mode; a second charging mode to perform charging at a second voltage level that is different than the first voltage level; a battery preconditioning mode; and an accessory load support mode that is operable during charging at a higher one of the first voltage level and the second voltage level and during operation at a higher one of the first voltage level and the second voltage level.

In other features, the first plurality of switches of the contactor includes a first switch including a first terminal connected to a first terminal of the charge port, a second terminal connected to a first terminal of the energy storage system and a control terminal connected to the controller. A second switch includes a first terminal connected to a second terminal of the charge port, a second terminal connected to a second terminal of the energy storage system and a control terminal connected to the controller. A third switch includes a first terminal connected to the first terminal of the charge port, a second terminal connected to a first terminal of a first one of the plurality of vehicle loads and a control terminal connected to the controller. A fourth switch includes a first terminal connected to the second terminal of the charge port, a second terminal connected to a second terminal of the first one of the plurality of vehicle loads and a control terminal connected to the controller.

In other features, the bi-directional DC-DC converter includes a first capacitor including a first terminal connected to the second terminal of the first switch and a second terminal connected to the second terminal of the second switch; a first power switch including a first terminal connected to the second terminal of the first switch; an inductor including a first terminal and a second terminal; a second power switch including a first terminal connected to a second terminal of the first power switch and the first terminal of the inductor, and a second terminal connected to the second terminal of the second switch; and a second capacitor including a first terminal connected to the second terminal of the inductor and the first one of the plurality of vehicle loads, and a second terminal connected to the second terminal of the second switch.

In other features, a fifth switch includes a first terminal connected to the second terminal of the inductor, the first terminal of the second capacitor, and the first one of the plurality of vehicle loads. A fusible link includes a first terminal connected to a second terminal of the fifth switch and a second terminal connected to a second one of the plurality of vehicle loads and the second terminal of the third switch. A sixth switch includes a first terminal connected to the second terminal of the second capacitor and the first one of the plurality of vehicle loads and a second terminal connected to the second one of the plurality of vehicle loads and the second terminal of the fourth switch.

In other features, the energy storage system includes a fifth switch of the second plurality of switches including a first terminal connected to the second terminal of the first switch; a sixth switch of the second plurality of switches including a first terminal connected to the second terminal of the first switch; a first fusible link including a first terminal connected to a second terminal of the sixth switch; a first battery pack of the one or more battery packs including a first terminal and a second terminal; a second battery pack of the one or more battery packs including a first terminal and a second terminal; a resistor including a first terminal connected to a second terminal of the fifth switch and a second terminal connected to a second terminal of the first fusible link and the first terminal of the first battery pack, wherein the first terminal of the second battery pack is connected to the second terminal of the first battery pack; a seventh switch of the second plurality of switches including a first terminal connected to the second terminal of the second battery pack; and a second fusible link including a first terminal connected to a second terminal of the seventh switch and a second terminal connected to the second terminal of the second switch.

In other features, the energy storage system includes a fifth switch of the second plurality of switches including a first terminal connected to the second terminal of the first switch; a sixth switch of the second plurality of switches including a first terminal connected to the second terminal of the first switch; a first battery pack of the one or more battery packs including a first terminal and a second terminal; a resistor including a first terminal connected to a second terminal of the fifth switch and a second terminal connected to a second terminal of the sixth switch and the first terminal of the first battery pack; a seventh switch of the second plurality of switches including a first terminal connected to the second terminal of the first switch; an eighth switch of the second plurality of switches including a first terminal connected to a second terminal of the seventh switch and a second terminal connected to the second terminal of the first battery pack; a second battery pack of the one or more battery packs including a first terminal and a second terminal; a fusible link including a first terminal connected to the second terminal of the seventh switch and the first terminal of the eighth switch and a second terminal connected to the first terminal of the second battery pack; a ninth switch of the second plurality of switches including a first terminal connected to the second terminal of the second battery pack and a second terminal connected to the second terminal of the second switch; and a tenth switch of the second plurality of switches including a first terminal connected to the second terminal of the first battery pack and a second terminal connected to the second terminal of the second switch.

In other features, the bi-direction DC-DC converter includes a capacitor connected to the second terminal of the first switch and the second terminal of the second switch; a first power switch, a second power switch, a third power switch and a fourth power switch each including a first terminal, a second terminal and a control terminal; and an inductor. The first terminal of the first power switch is connected to the second terminal of the first switch. The second terminal of the first power switch is connected to the first terminal of the third power switch and a first terminal of the inductor. The first terminal of the second power switch is connected to a first node. The second terminal of the second power switch is connected to a second terminal of the inductor and a first terminal of the fourth power switch. The second terminal of the fourth power switch is connected a second node.

In other features, a fifth switch includes a first terminal connected to the first node and a second terminal connected first terminals of the vehicle loads. A sixth switch includes a first terminal connected to the second node and a second terminal connected to second terminals of the vehicle loads.

In other features, the plurality of vehicles loads include a first vehicle load and a second vehicle load. The first node is connected to a first terminal of the first vehicle load and a first terminal of a fifth switch. A second terminal of the fifth switch is connected to a first terminal of the second vehicle load. The second node is connected to a second terminal of the first vehicle load and the second vehicle load.

In other features, a fifth switch including a first terminal and a second terminal. A sixth switch includes a first terminal and a second terminal. The plurality of vehicles loads include a first vehicle load and a second vehicle load. The first node is connected a first terminal of the first vehicle loads and a first terminal of a fusible link. A second terminal of the fusible link is connected to a first terminal of the fifth switch. A second terminal of the fifth switch is connected to a second terminal of the third switch and first terminals of the second vehicle load. The second node is connected to a first terminal of the first vehicle load and a first terminal of the sixth switch. A second terminal of the second switch is connected to a second terminal of the second vehicle load and the second terminal of the fourth switch.

A power control system for a vehicle includes a charge port and a contactor connected to the charge port and including a first plurality of switches. An energy storage system includes a second plurality of switches and one or more battery packs. A bi-directional DC-DC converter is connected between the energy storage system and a plurality of vehicle loads. A controller is configured to control states of the first plurality of switches and the second plurality of switches to configure in a plurality of modes. The first plurality of switches comprises a first switch including a first terminal connected to a first terminal of the charge port, a second terminal connected to a first terminal of the energy storage system and a control terminal connected to the controller. A second switch includes a first terminal connected to a second terminal of the charge port, a second terminal connected to a second terminal of the energy storage system and a control terminal connected to the controller. A third switch including a first terminal connected to the first terminal of the charge port, a second terminal connected to a first terminal of a first one of the plurality of vehicle loads and a control terminal connected to the controller. A fourth switch includes a first terminal connected to the second terminal of the charge port, a second terminal connected to a second terminal of the first one of the plurality of vehicle loads and a control terminal connected to the controller.

In other features, the plurality of modes include a range improvement mode; a first charging mode to perform charging at a first voltage level, wherein one or more battery packs supply power at the first voltage level; a vehicle to vehicle charging mode; a second charging mode to perform charging at a second voltage level that is less than the first voltage level; a battery preconditioning mode; and an accessory load support mode that is operable during charging at a higher one of the first voltage level and the second voltage level and when operating at a higher one of the first voltage level and the second voltage level.

In other features, the bi-directional DC-DC converter includes a first capacitor including a first terminal connected to the second terminal of the first switch and a second terminal connected to the second terminal of the second switch; a first power switch including a first terminal connected to the second terminal of the first switch; an inductor including a first terminal and a second terminal; a second power switch including a first terminal connected to a second terminal of the first power switch and the first terminal of the inductor, and a second terminal connected to the second terminal of the second switch; and a second capacitor including a first terminal connected to the second terminal of the inductor and a first one of the vehicle loads, and a second terminal connected to the second terminal of the second switch.

In other features, a fifth switch includes a first terminal connected to the second terminal of the inductor, the first terminal of the second capacitor, and the first one of the plurality of vehicle loads. A fusible link includes a first terminal connected to a second terminal of the fifth switch and a second terminal connected to a second one of the plurality of vehicle loads and the second terminal of the third switch. A sixth switch includes a first terminal connected to the second terminal of the second capacitor and the first one of the plurality of vehicle loads and a second terminal connected to the second one of the plurality of vehicle loads and the second terminal of the fourth switch.

In other features, the energy storage system includes a fifth switch of the second plurality of switches including a first terminal connected to the second terminal of the first switch. A sixth switch of the second plurality of switches including a first terminal connected to the second terminal of the first switch. A first fusible link includes a first terminal connected to a second terminal of the sixth switch. A first battery pack of the one or more battery packs including a first terminal and a second terminal. A second battery pack of the one or more battery packs includes a first terminal and a second terminal. A resistor includes a first terminal connected to a second terminal of the fifth switch and a second terminal connected to a second terminal of the first fusible link and the first terminal of the first battery pack. The first terminal of the second battery pack is connected to the second terminal of the first battery pack. A seventh switch of the second plurality of switches includes a first terminal connected to the second terminal of the second battery pack. A second fusible link includes a first terminal connected to a second terminal of the seventh switch and a second terminal connected to the second terminal of the second switch.

In other features, the energy storage system includes a fifth switch of the second plurality of switches including a first terminal connected to the second terminal of the first switch. A sixth switch of the second plurality of switches includes a first terminal connected to the second terminal of the first switch. A first battery pack of the one or more battery packs includes a first terminal and a second terminal. A resistor includes a first terminal connected to a second terminal of the fifth switch and a second terminal connected to a second terminal of the sixth switch and the first terminal of the first battery pack. A seventh switch of the second plurality of switches includes a first terminal connected to the second terminal of the first switch. An eighth switch of the second plurality of switches includes a first terminal connected to a second terminal of the seventh switch and a second terminal connected to the second terminal of the first battery pack. A second battery pack of the one or more battery packs includes a first terminal and a second terminal. A fusible link includes a first terminal connected to the second terminal of the seventh switch and the first terminal of the eighth switch and a second terminal connected to the first terminal of the second battery pack. A ninth switch of the second plurality of switches includes a first terminal connected to the second terminal of the second battery pack and a second terminal connected to the second terminal of the second switch. A tenth switch of the second plurality of switches includes a first terminal connected to the second terminal of the first battery pack and a second terminal connected to the second terminal of the second switch.

In other features, the bi-direction DC-DC converter includes a capacitor connected to the second terminal of the first switch and the second terminal of the second switch. A first power switch, a second power switch, a third power switch and a fourth power switch each include a first terminal, a second terminal and a control terminal. The first terminal of the first power switch is connected to the second terminal of the first switch. The second terminal of the first power switch is connected to the first terminal of the third power switch and a first terminal of an inductor. The first terminal of the second power switch is connected to a first node. The second terminal of the second power switch is connected to a second terminal of the inductor and a first terminal of the fourth power switch. The second terminal of the fourth power switch is connected a second node.

In other features, a fifth switch includes a first terminal connected to the first node and a second terminal connected first terminals of the vehicle loads. A sixth switch includes a first terminal connected to the second node and a second terminal connected to second terminals of the vehicle loads.

In other features, the plurality of vehicles loads include a first vehicle load and a second vehicle load. The first node is connected a first terminal of the first vehicle load and a first terminal of the fifth switch. A second terminal of the fifth switch is connected to a first terminal of the second vehicle load. The second node is connected to a second terminal of the first vehicle load and the second vehicle load.

In other features, a fifth switch including a first terminal and a second terminal. A sixth switch includes a first terminal and a second terminal. The plurality of vehicle loads include a first vehicle load and a second vehicle load. The first node is connected a first terminal of the first vehicle load and a first terminal of the fusible link. A second terminal of the fusible link is connected to a first terminal of the fifth switch. A second terminal of the fifth switch is connected to a second terminal of the third switch and first terminals of the second vehicle load. The second node is connected to a first terminal of the first vehicle load and a first terminal of the sixth switch. A second terminal of the second switch is connected to a second terminal of the second vehicle load and the second terminal of the fourth switch.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2A is a table illustrating an example of switch states of switches and a buck-boost converter of the battery system during various operating modes according to the present disclosure;

FIG. 3 is a functional block diagram of an example the battery system according to the present disclosure;

FIG. 5A is a table illustrating an example of states of switches and a buck-boost converter of the battery system during various operating modes according to the present disclosure;

FIG. 7 is a table illustrating an example of states of switches and a buck-boost converter of the battery system during various operating modes according to the present disclosure;

FIG. 9 is a table illustrating an example of states of switches and a buck-boost converter of the battery system during various operating modes according to the present disclosure;

FIG. 12 is a table illustrating an example of states of switches and a buck-boost converter of the battery system during various operating modes according to the present disclosure;

FIG. 14 is a table illustrating an example of states of switches and a buck-boost converter of the battery system during various operating modes according to the present disclosure.

In the drawings, reference numbers may be reused to identify similar and/or identical elements.

DETAILED DESCRIPTION

While the present disclosure describes a power control system for a battery system including a multi-mode bi-directional DC-DC converter for a battery electric vehicle (BEV), skilled artisans will appreciated that the battery system can be used in hybrid or other vehicles and/or in other applications.

The present disclosure describes a power control system including configurable switches and a bidirectional DC-DC converter to provide multiple selectable operating modes. Non-limiting examples of bidirectional DC-DC converter can be a buck-boost converter, a boost converter or a buck converter depending on vehicle applications. DC-DC converter can also be isolated (with transformer) or non-isolated DC-DC converter. Non-isolated DC-DC converters are used in this application as an example. Non-limiting examples of the selectable operating modes include range improvement, battery pre-conditioning, accessory load support, backward DC Fast Charge (DCFC) compatibility, vehicle to vehicle charging, and/or vehicle to X (where X is any other device, utility or other power domain).

Figure 1:
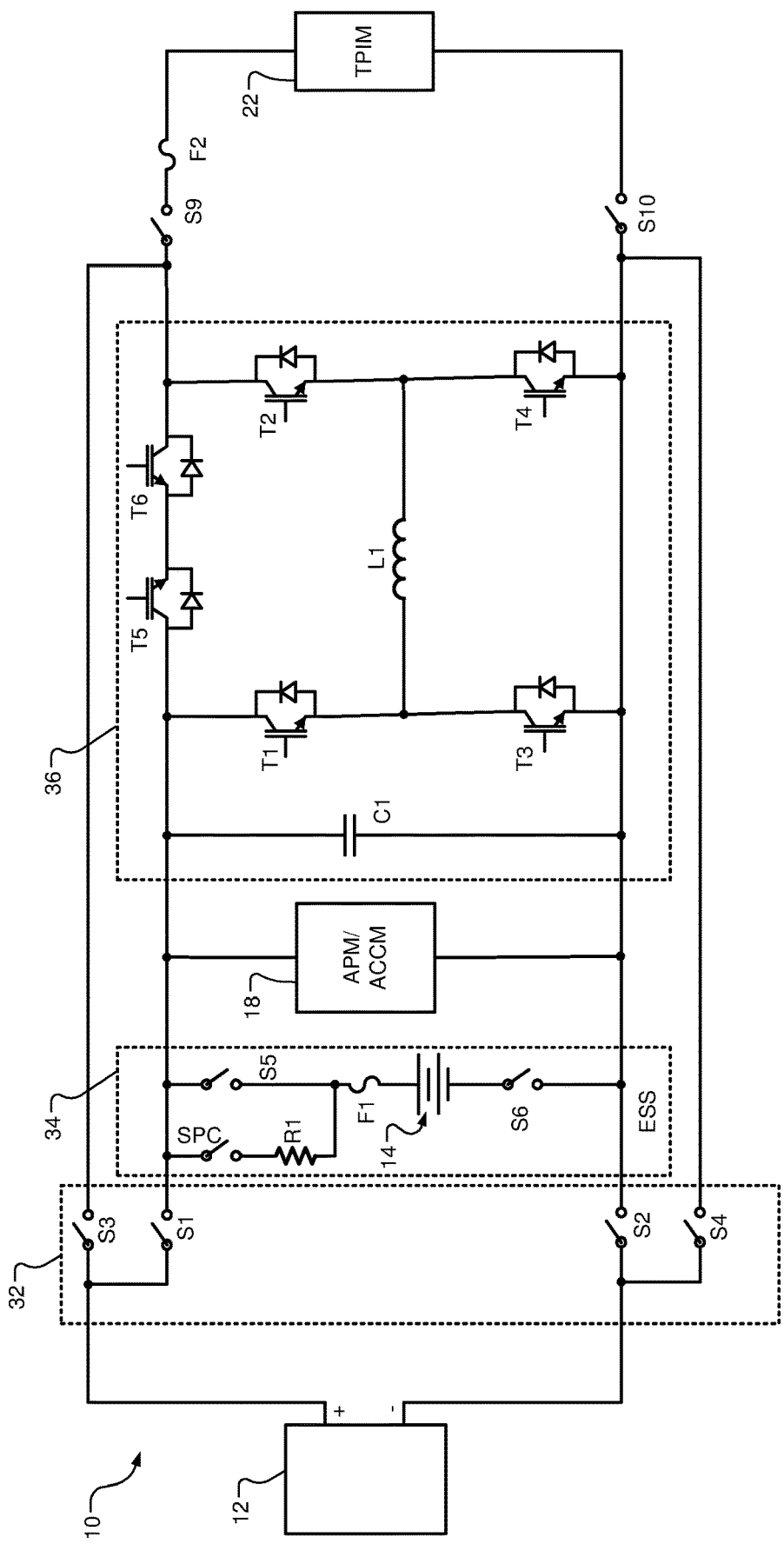
FIG. 1 is a functional block diagram of an example of a power control system for a battery system of a vehicle according to the present disclosure.

Referring now to FIG. 1, a power control system 10 is shown. In some examples, the power control system 10 is a 400V drive system, although other voltage levels can be used. As will be described further below, the power control system 10 supports various operating modes including range improvement, vehicle-to-vehicle charging, accessory load support, battery preconditioning, and/or backward/forward compatibility.

In some examples, the power control system 10 includes a charge port 12 and provides power to first vehicle loads 18 including a one or more sub-modules such as an accessory power module (APM) and/or an air conditioning compressor module (ACCM) and second vehicle loads 22 such as a traction power inverter module (TPIM), although other types of vehicle loads can be used. The power control system 10 further includes contactors 32, an energy storage system (ESS) 34, and a buck-boost converter 36.

The contactors 32 include switches S1 and S3 having a first terminal connected to a positive terminal of the charge port 12. The contactors 32 further include switches S2 and S4 having first terminals connected to a negative terminal of the charge port 12.

The ESS 34 includes a battery pack 14 and switches SPC, S5 and S6. The switch SPC is a pre-charge contactor. As can be appreciated, the switches can include mechanical relays and/or solid state switches. First terminals of the switches SPC and S5 are connected to a second terminal of the switch S1. A second terminal of the switch SPC is connected by a resistor R1 to a second terminal of the switch S5 and a first terminal of a fusible link F1 (such as a fuse or circuit breaker).

A second terminal of the fusible link F1 is connected to a positive terminal of the battery pack 14 that includes one or more battery cells. A negative terminal of the battery pack 14 is connected to a first terminal of a switch S6. A second terminal of the switch S6 is connected to a second terminal of the switch S2.

The buck-boost converter 36 includes a capacitor C1 having a first terminal connected to the first terminal of the switch S1 and a second terminal connected to the second terminal of the switch S2. A first terminal of a power switch T1 is connected to the second terminal of the switch S1. A second terminal of the power switch T1 is connected to a first terminal of an inductor L1 and a first terminal of a power switch T3. A second terminal of the power switch T3 is connected to the second terminal of the switch S2.

The buck-boost converter 36 further includes power switches T5 and T6 which form a bidirectional power switch that is used to bypass the DC-DC converter. While an exemplary configuration of a bi-directional switch is shown, other types of bi-directional power switches can be used. This bidirectional DC-DC switch is optional if other switches such as S1 and S3 are on and provide the bypass function. The power switch T5 includes a first terminal connected to the second terminal of the switch S1 and a second terminal connected to a second terminal of the power switch T6. A second terminal of the power switch T6 is connected to a first terminal of a switch S9, a second terminal of the switch S3, and to a first terminal of a power switch T2. A second terminal of the power switch T2 is connected to a second terminal of the inductor L1 and a first terminal of a power switch T4. A second terminal of the power switch T4 is connected to the second terminal of the switch S2, a second terminal of the switch S4 and a first terminal of the switch S10.

A second terminal of the switch S9 is connected to the second vehicle loads 22 and to a first terminal of a fusible link F2. A second terminal of the fusible link F2 is connected to a first terminal of the second vehicle loads 22. The second vehicle loads 22 are connected to the second terminal of the switch S10. In some examples, the first loads 18 are always connected to battery when a low voltage battery (e.g. 400V) is used.

In some examples, the power switches T1 to T6 may include voltage-controlled bipolar switching devices in the form of insulated gate bipolar transistors (IGBTs), metal-oxide semiconductor field effect transistors (MOSFETs), silicon carbide (SIC) MOSFET, wideband GaN devices (WBG), or other suitable switches having a control terminal to turn on and off.

Figure 2B:
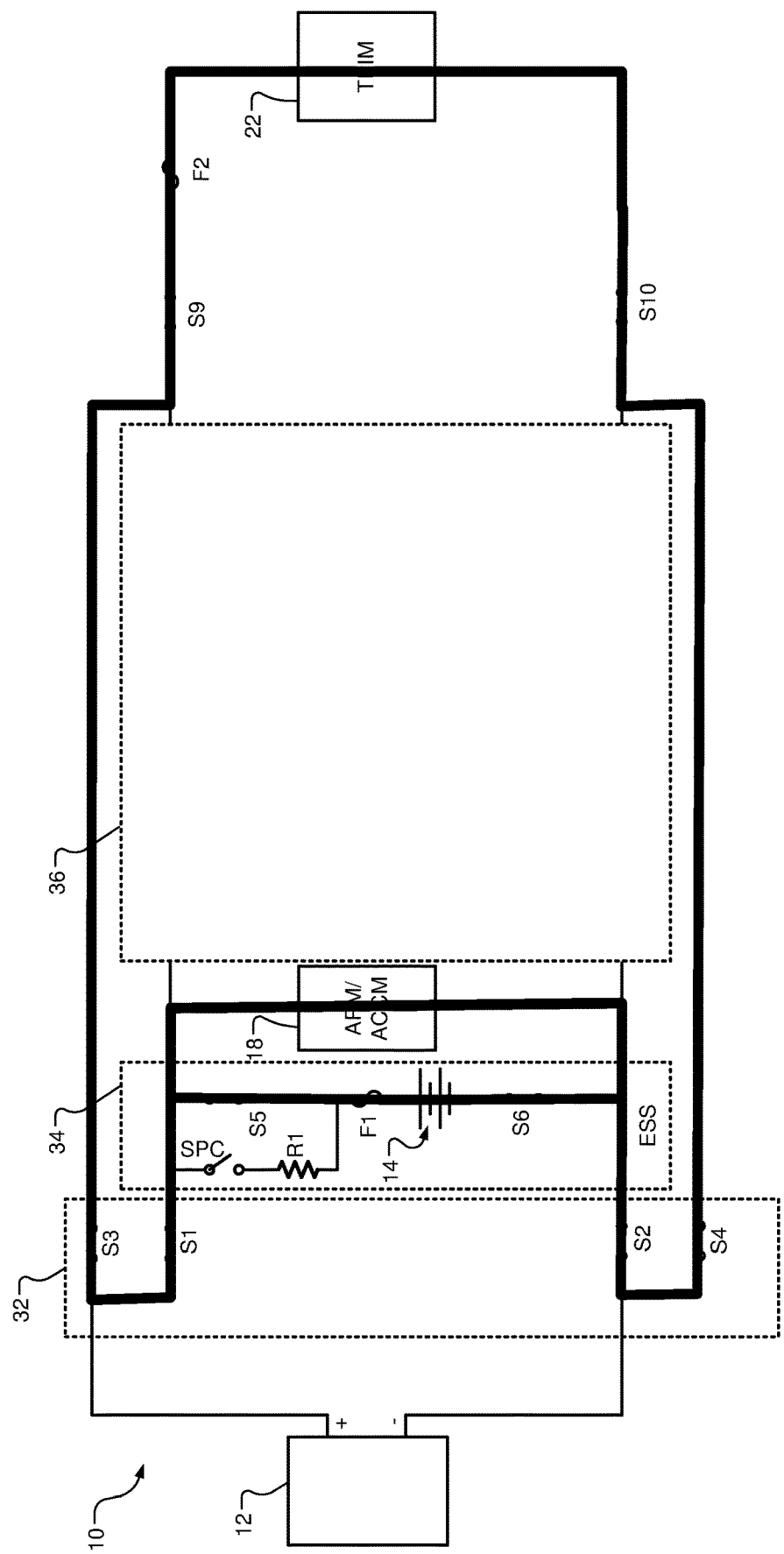
FIGS. 2B to 2I show the battery system of FIG. 1 in various operating modes according to the present disclosure.

Referring now to FIG. 2A, the positions of the switches during various operating modes are shown. In this example, the drive system and battery assume to be a low voltage system (e.g. 400V). In a normal driving mode in FIGS. 2A and 2B, either the switches S1 and S3 is on or bi-directional power switch T5 and T6 is on to bypass DC-DC converter. S5, S6 and switches S9 and S10 are on, the switch S2, S4 SPC is off and the buck-boost converter 36 is off (in standby mode). The battery directly supplies power to the TPIM 22.

Figure 2C:
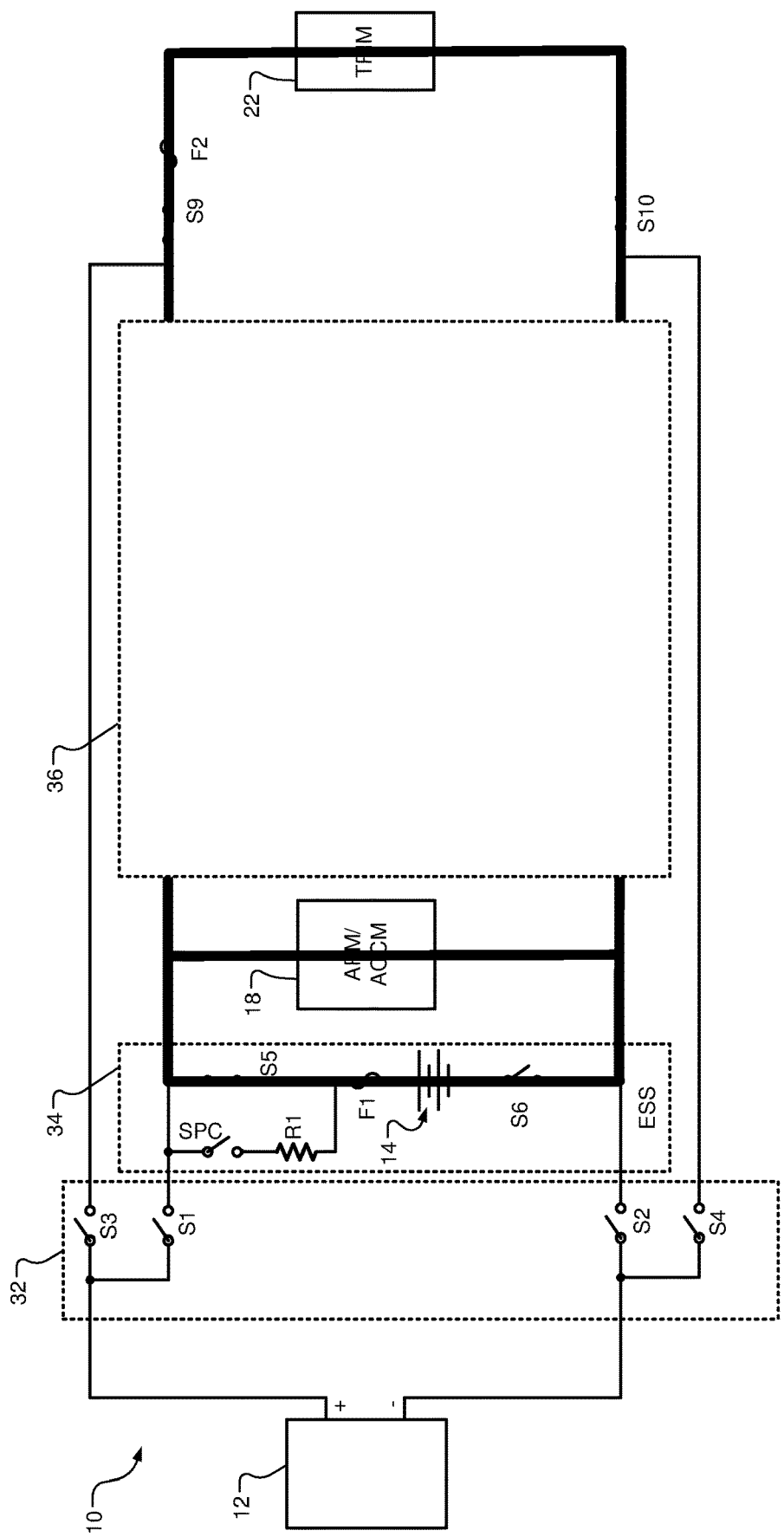

In a range improvement mode in FIGS. 2A and 2C, the switches S1 to S4 are off and/or bi-directional power switch T5 and T6 is off, switches S5, S6, S9, and S10 are on, the switch SPC is off and the buck-boost converter 36 is on (in operating mode).

Figure 2D:
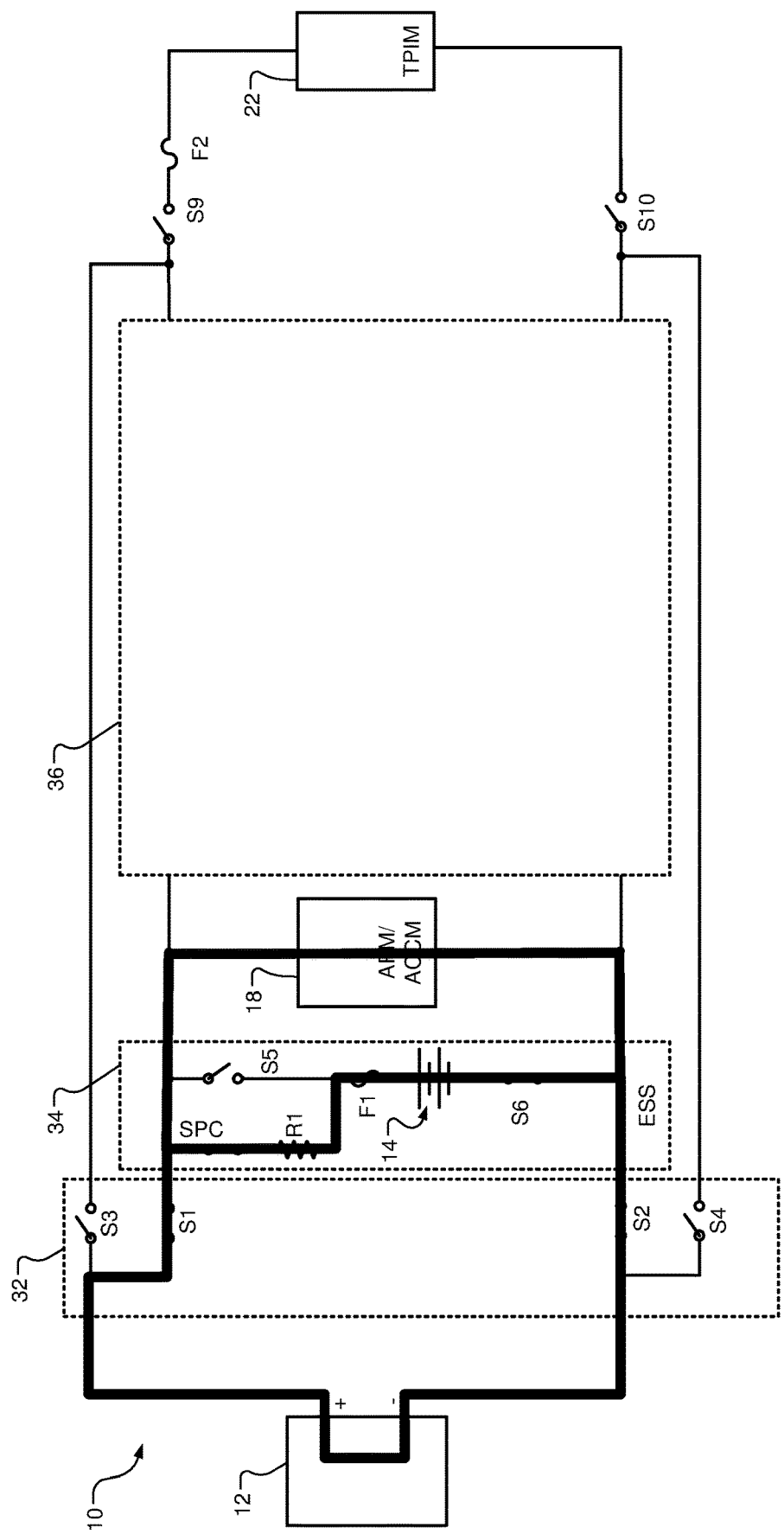

In a pre-charging mode in FIGS. 2A and 2D, the switches S1, S2, S6 and the SPC are on, the switches S3, S4, S5, S9, and S10 are off, and the buck-boost converter 36 is off.

Figure 2E:
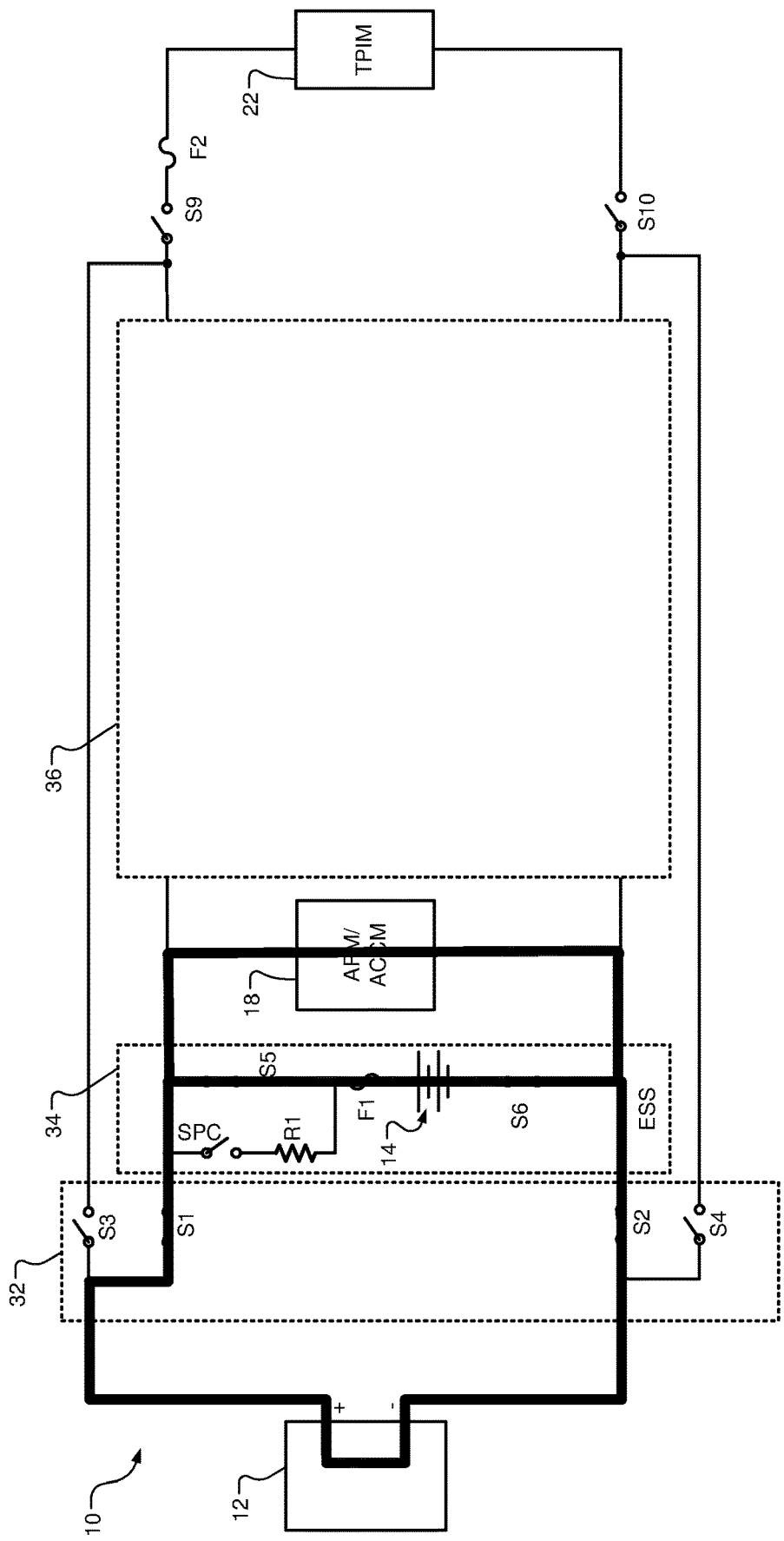

When charging from a 400V grid in FIGS. 2A and 2E, the switches S1, S2, S5 and S6 are on, the switches S3, S4, S9, S10 and SPC are off and the buck-boost converter 36 is off.

Figure 2F:
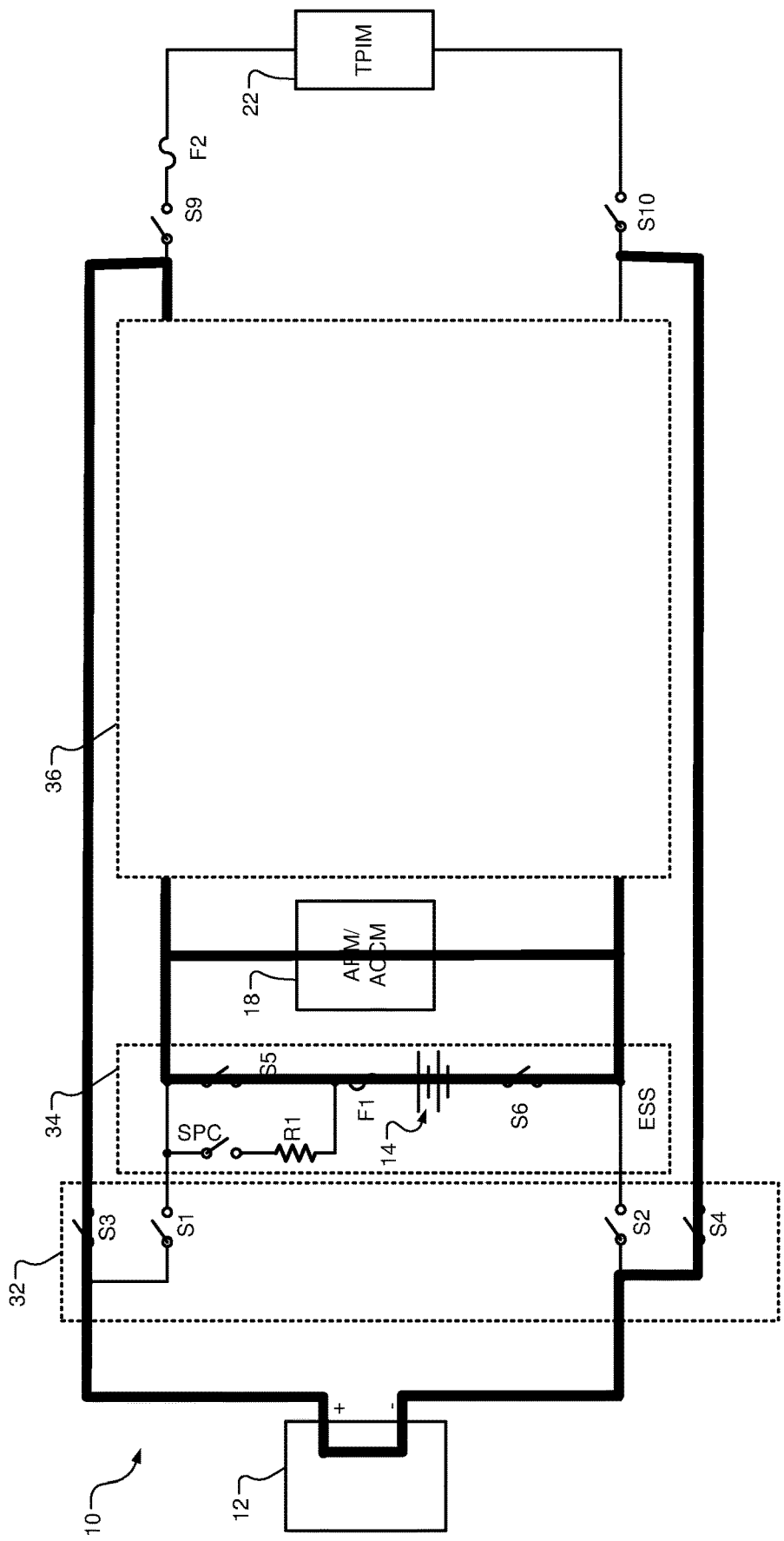

When charging from an 800 V grid in FIGS. 2A and 2F, the switches S1, S2, S9, S10 and SPC are off, the switches S3 to S6 and the buck-boost converter 36 are on.

Figure 2G:
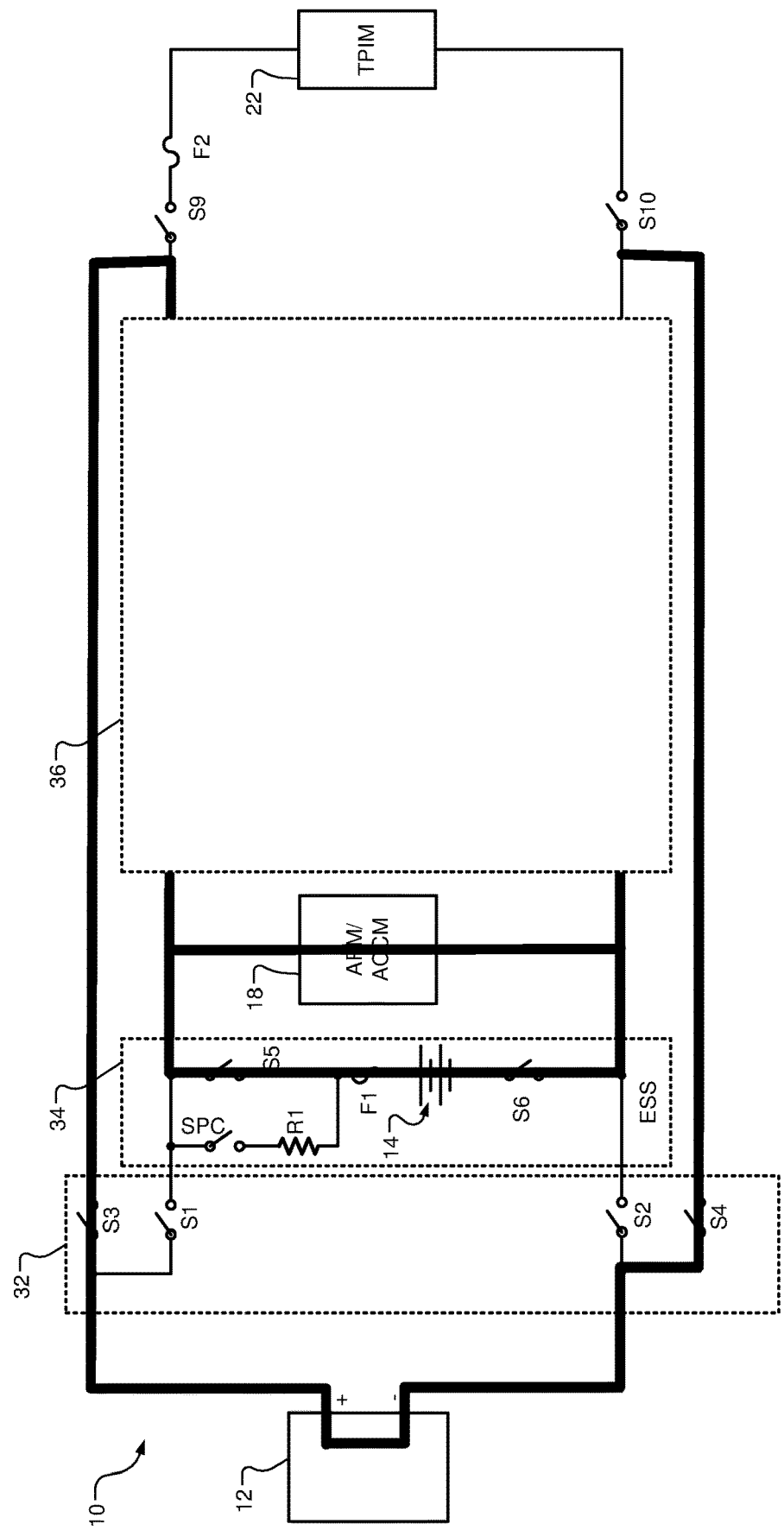
Figure 2H:
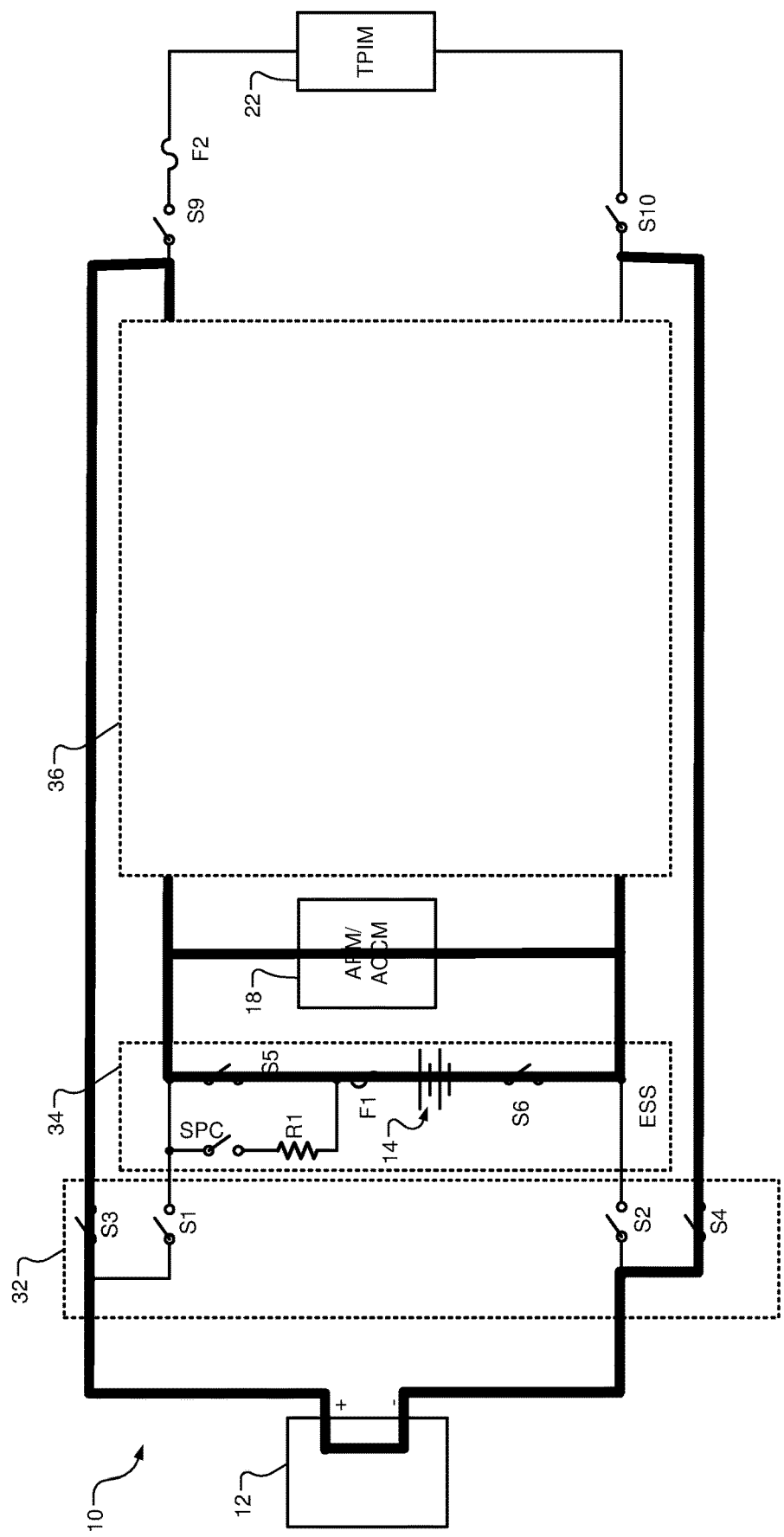

When charging an ESS of another vehicle at 400V or 800V in FIGS. 2A, 2G, and 2H the switches S1, S2, S9 and S10 and SPC are off and the switches S3 to S6, and the buck-boost converter 36 are on.

Figure 2I:
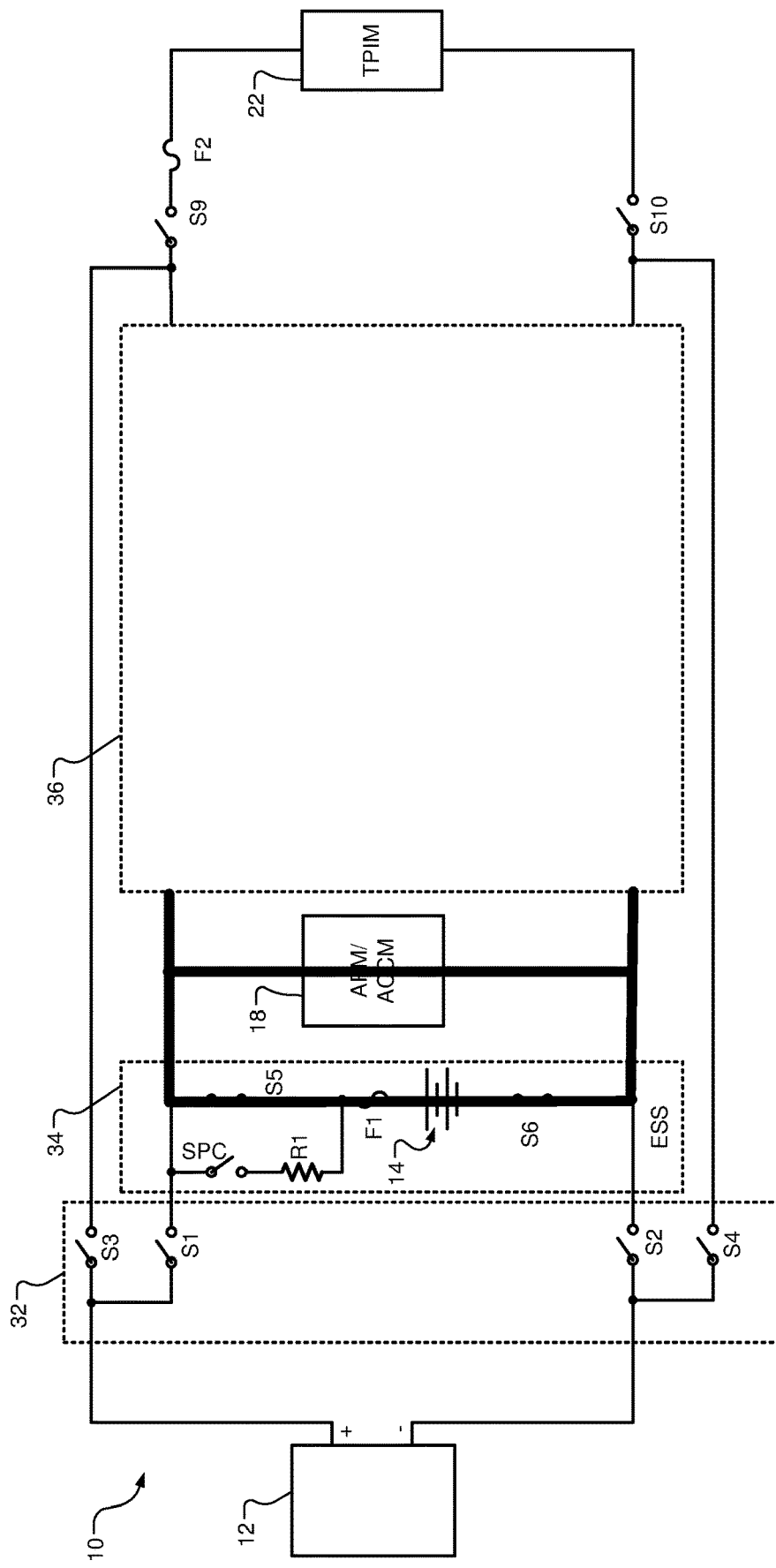

When performing battery preconditioning in FIGS. 2A and 2I, the switches S1, S2, S3, S4, S9, S10 and SPC are off and the switches S5, S6 and the buck-boost converter 36 are on.

Referring now to FIG. 3, a controller 60 executes an application configured to control power switches 68 of the buck-boost converter 36 and switches 64 based upon inputs from sensors 66 (such as current, voltage, temperature, speed, torque, and other sensors), a user interface 72, other vehicle systems 74, or other input. In some examples, the user interface 72 allows a driver or occupant to select the mode (such as the range improvement mode) of the battery system using a button, touch panel or other user interface.

Figure 4:
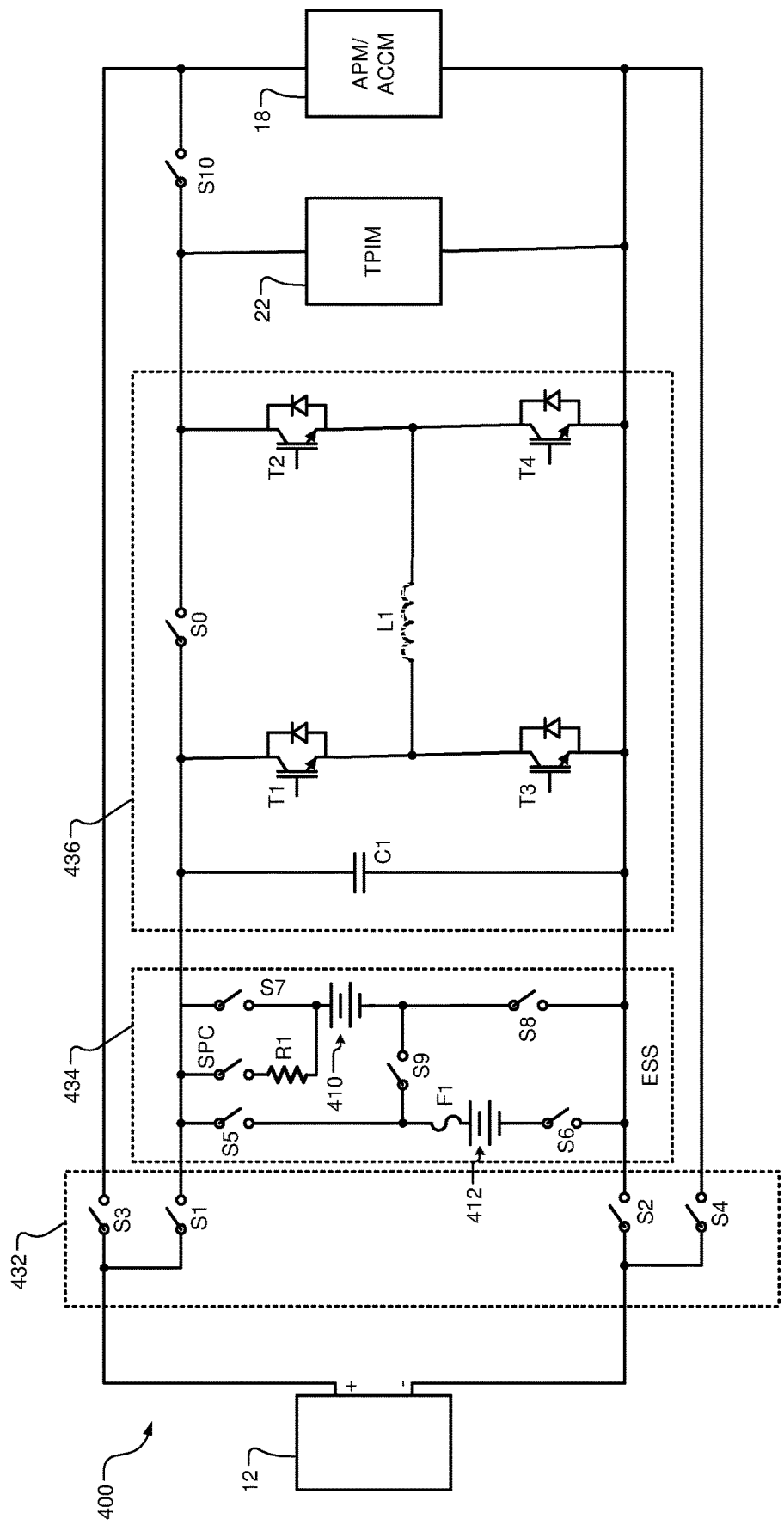
FIG. 4 is a functional block diagram of another example of a power control system for a battery system of a vehicle according to the present disclosure.

Referring now to FIG. 4, another power control circuit 400 is shown. In some examples, the power control circuit 400 is a 400V drive system with a flexible battery (or flexbatt) battery configuration. The power control circuit 400 supports various modes including range improvement, vehicle-to-vehicle charging, battery preconditioning, and/or 400V accessory load support during 800V charging.

The power control circuit 400 includes a charge port 12 and supplies power to the first vehicle loads 18, the second vehicle loads 22 and/or other vehicle loads. The power control circuit 400 further includes contactors 432, an energy storage system (ESS) 434 (including a first battery pack 410 and a second battery pack 412), and a buck-boost converter 436.

First terminals of switches S1 and S3 are connected to a positive terminal of the charge port 12. First terminals of switches S2 and S4 are connected to a negative terminal of the charge port 12. First terminals of switches S5, S7 and SPC are connected to a second terminal of the switch S1. A second terminal of the switch S7 is connected by a resistor R1 to a second terminal of the switch SPC and to a first terminal of the first battery pack 410. A second terminal of the switch S5 is connected to a first terminal of the switch S9 and a first terminal of a fusible link F1. A second terminal of the switch S9 is connected to a second terminal of the first battery pack 410 and to a first terminal of a switch S8. A second terminal of the second battery pack 412 is connected to a first terminal of a switch S6. Second terminals of the switches S6 and S8 are connected to a second terminal of the switch S2.

The buck-boost converter 436 includes a capacitor C1 having a first terminal connected to the second terminal of the switch S1 and a second terminal connected to the second terminal of the switch S2. A first terminal of a power switch T1 is connected to the second terminal of the switch S1 and a first terminal of a bidirectional bypass switch S0. A second terminal of the power switch T1 is connected to a first terminal of an inductor L1 and a first terminal of a switch T3. A second terminal of the power switch T3 is connected to the second terminal of the switch S2.

A first terminal of the power switch T2 is connected to a second terminal of the switch S0, a first terminal of the second vehicle loads 22 and a first terminal of a fusible link F2. A second terminal of the power switch T2 is connected to a second terminal of an inductor L1 and to a first terminal of a power switch T4. A second terminal of the power switch T4 is connected to the second terminal of the switch S2, a second terminal of the second vehicle loads 22, the second terminal of the first vehicle loads 18, and a second terminal of the switch S4. A second terminal of the fusible link F2 is connected to the first terminal of the switch S10. The second terminal of the switch S10 is connected to the first terminal of vehicle load 18 and second terminal of switch S3.

Figure 5B:
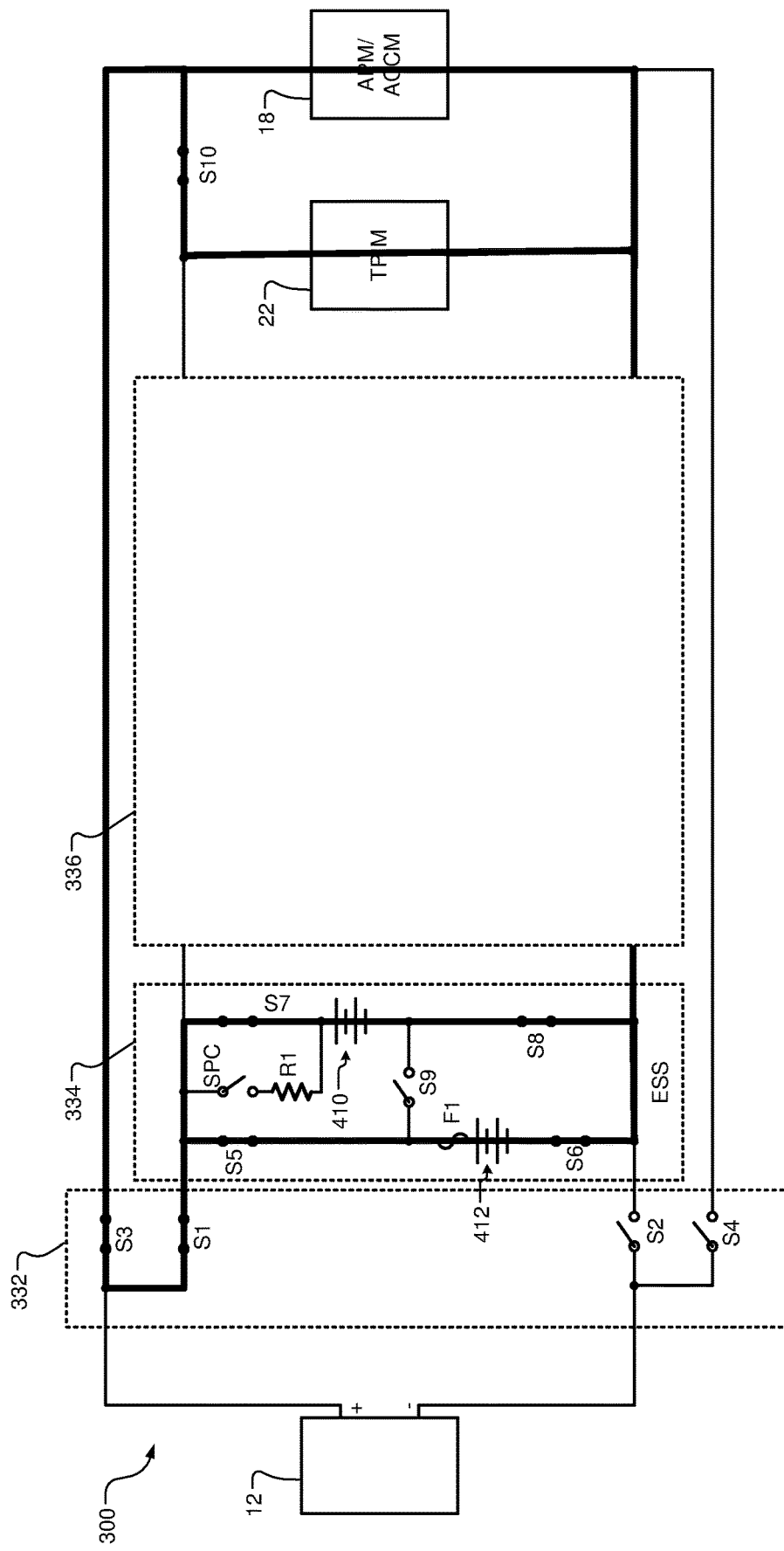
FIGS. 5B to 5H show the battery system of FIG. 4 in various operating modes according to the present disclosure.

Referring now to FIG. 5A, the power control circuit 400 operates in various operating modes. In a normal driving mode in FIGS. 5A and 5B, the switches S1, S3 S5 to S8 and S10 are on. The battery directly provides power to TPIM 22 and accessory loads 18. Switches S2, S4, S9 and SPC and the buck-boost converter are off.

Figure 5C:
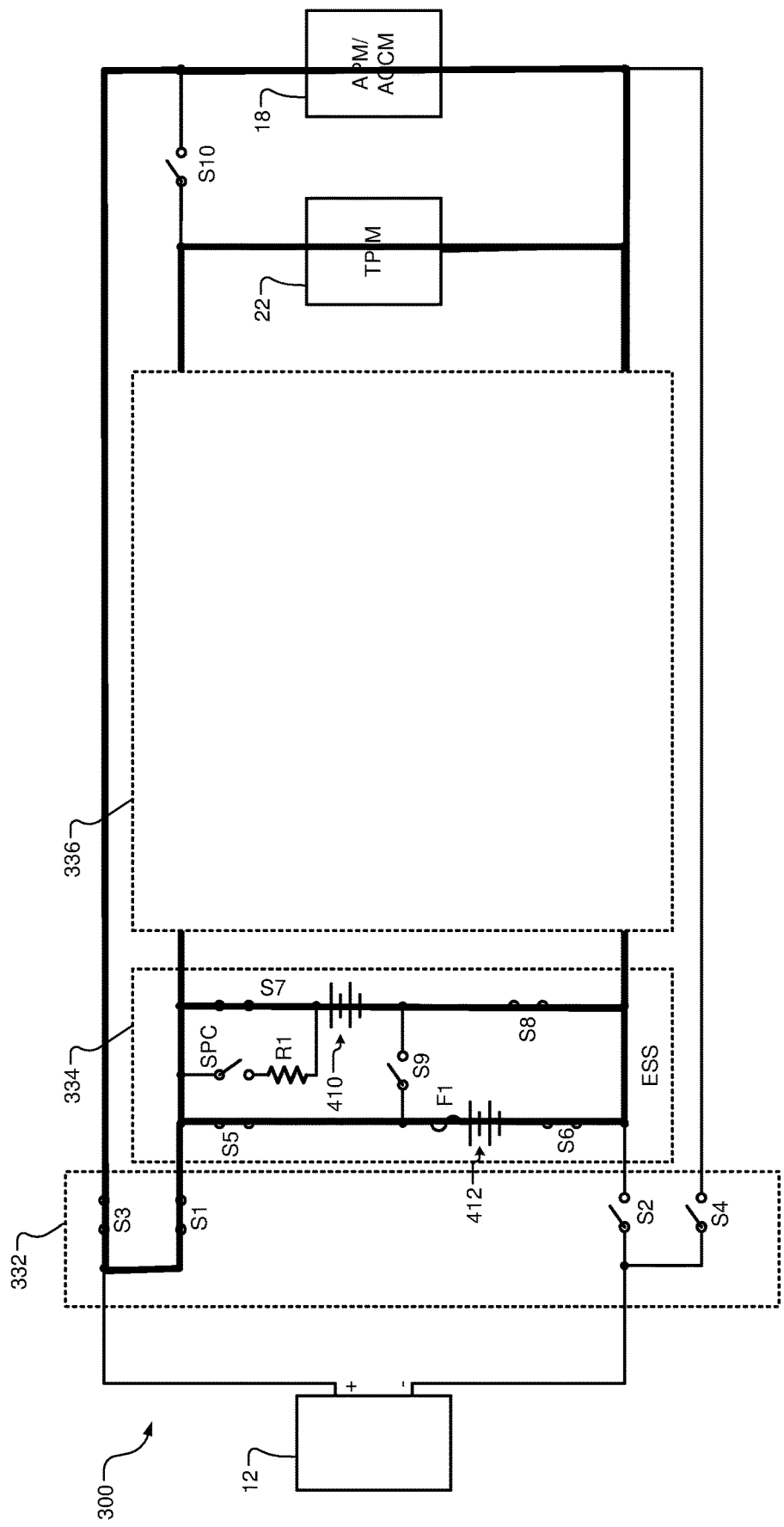

In a range improvement mode in FIGS. 5A and 5C, the switches S1 and S3 are on and switch S10 is off to support vehicle load 18, S9 and SPC are off, switches S5 to S8 are on and the buck-boost converter 436 is on.

Figure 5D:
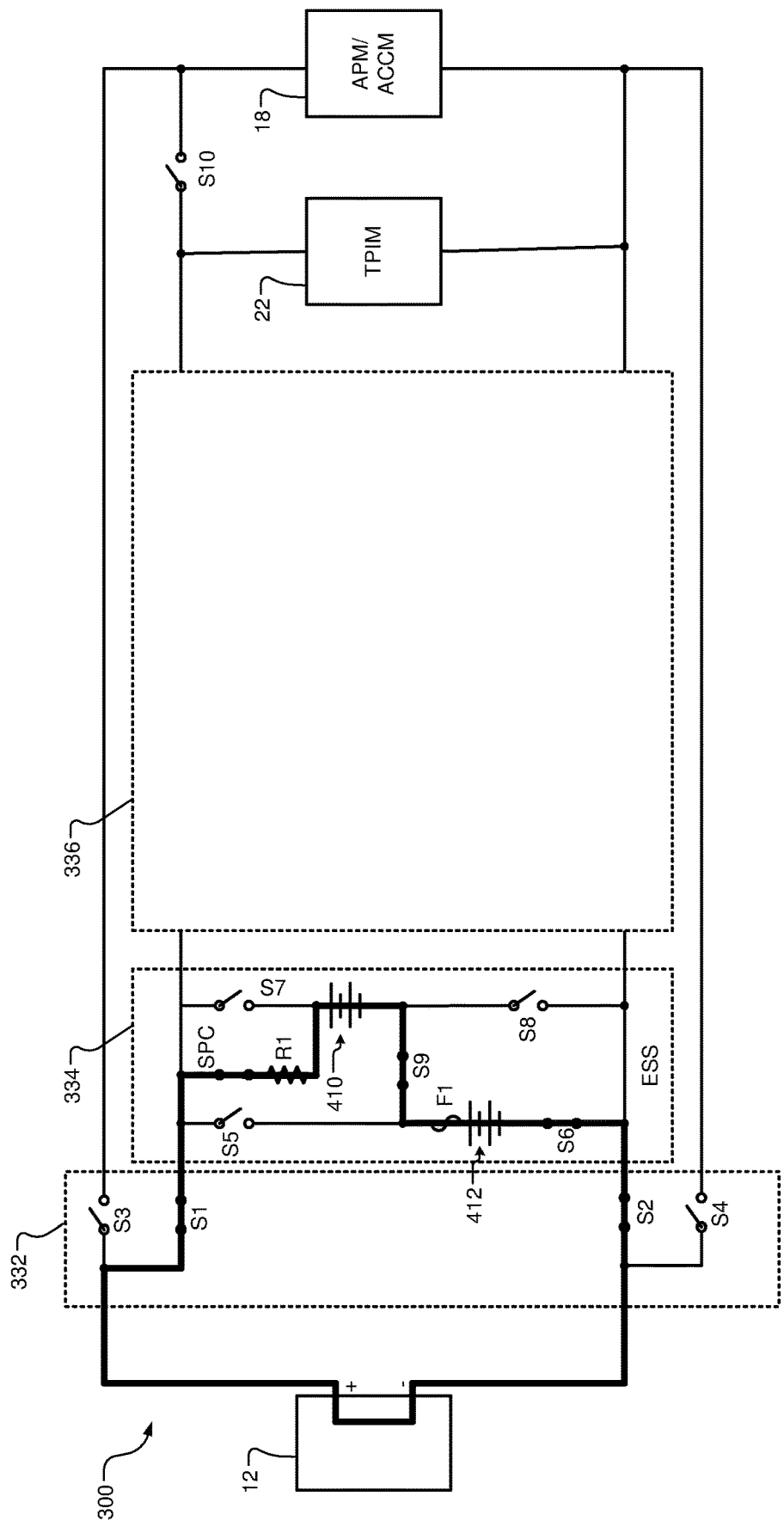

In a pre-charging mode in FIGS. 5A and 5D, the switches S1, S2, S6, S9 and SPC are on and switches S3, S4, S5, S7, S8, S10 and the buck-boost converter 436 are off.

Figure 5E:
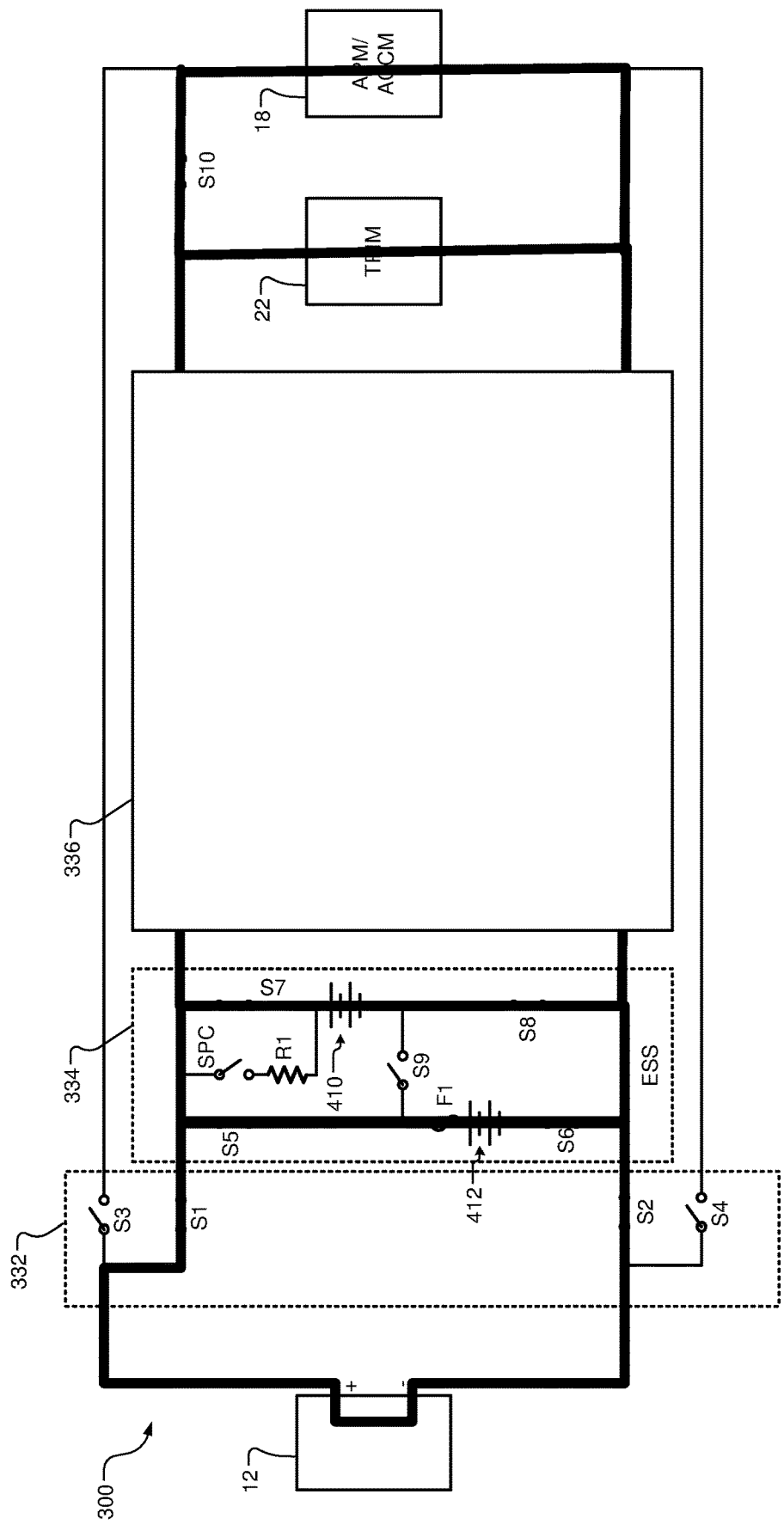

When charging from the 400 V grid in FIGS. 5A and 5E, the switches S1, S2, S5 to S8 are on, switches S3, S4, S9 and SPC are off and the buck-boost converter 436 and S10 are on to support the vehicle loads 18.

Figure 5F:
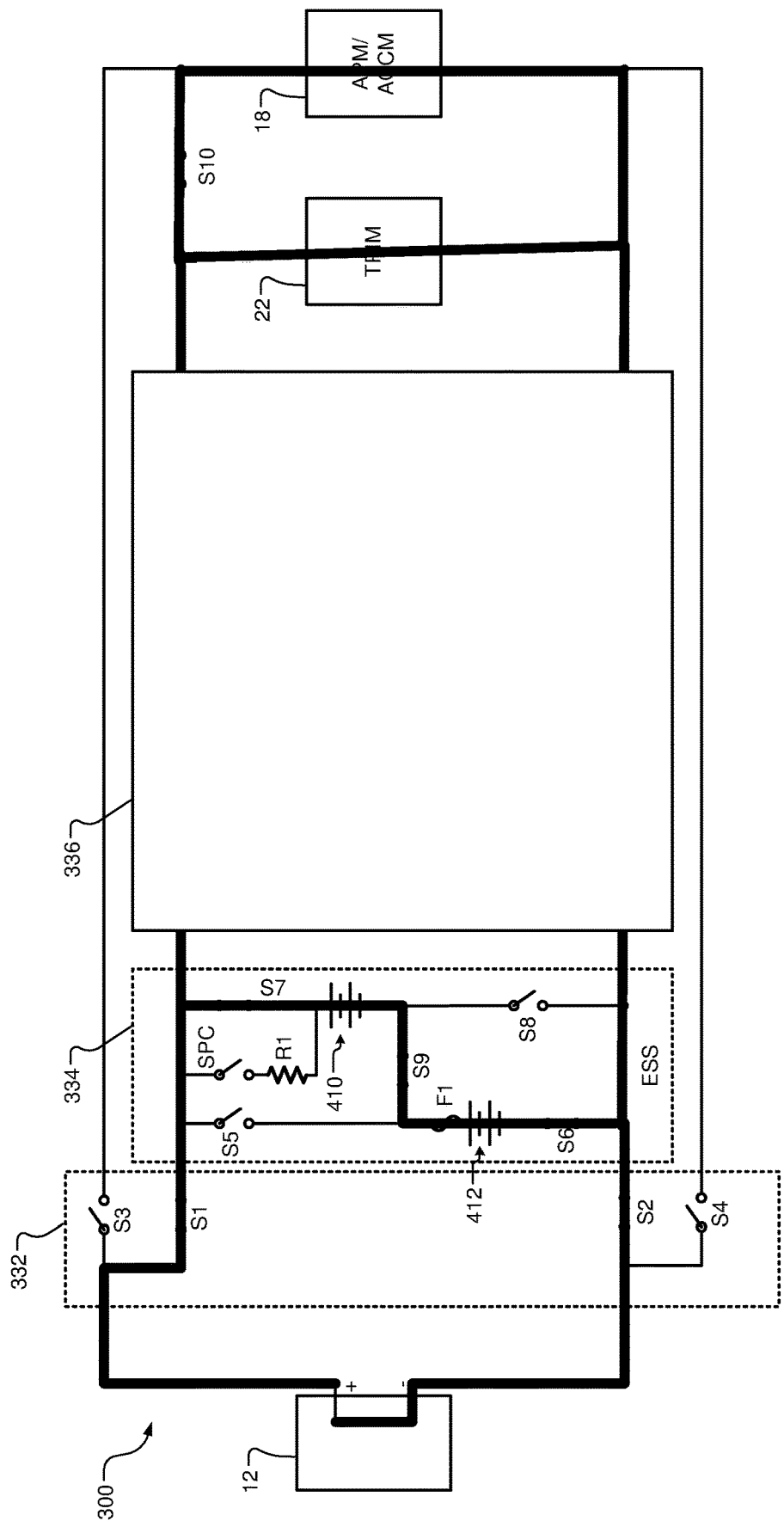

When charging from an 800V grid in FIGS. 5A and 5F, the switches S1, S2, S6, S7, and S9 are on, switches S3, S4, S5, S8 and SPC are off and the buck-boost converter 436 and S10 are on to support vehicle load 18.

Figure 5G:
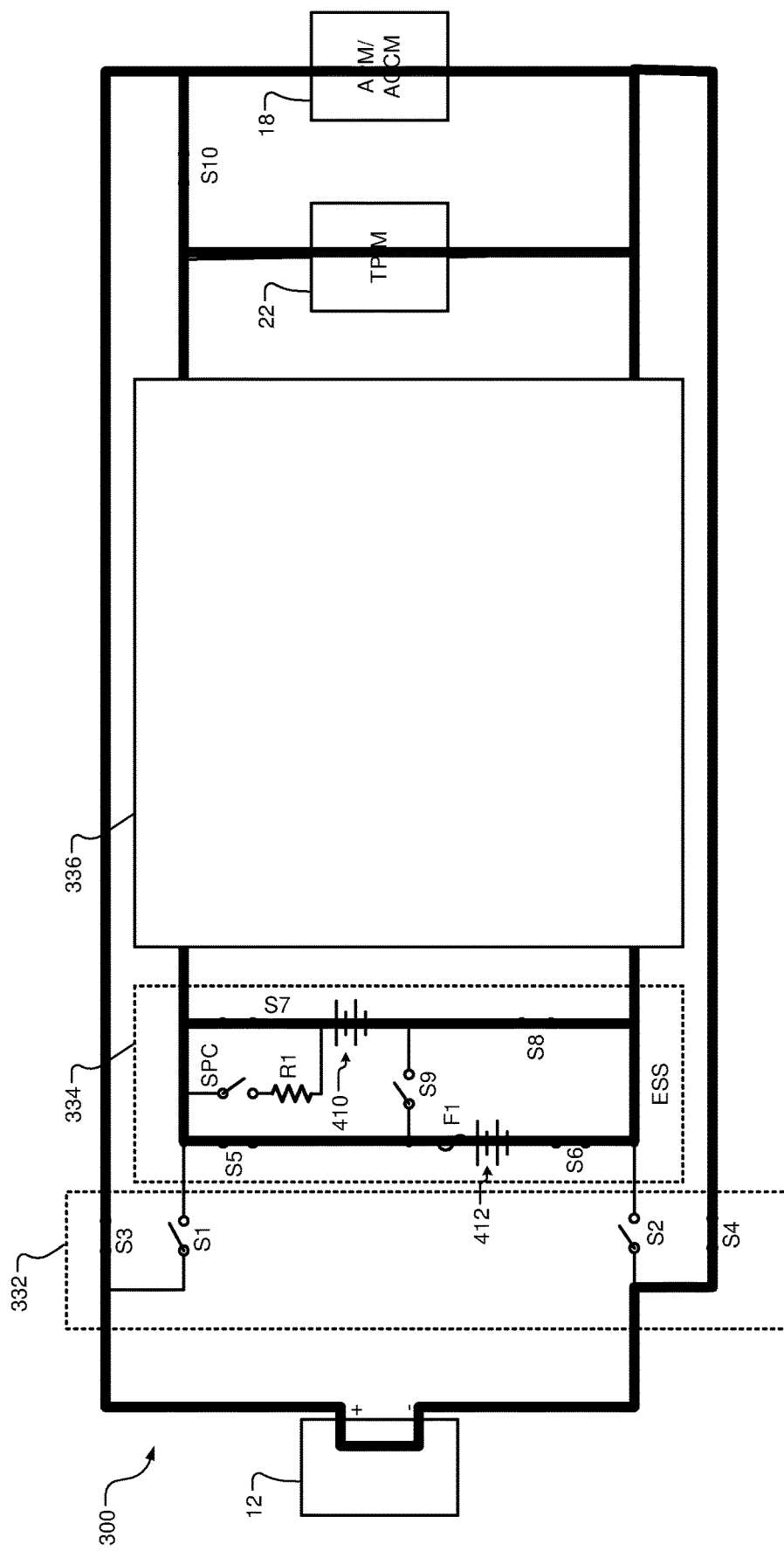

When charging a second vehicle having a 400V ESS in FIGS. 5A and 5G, the switches S3 to S8 are on, the switches S1, S2, S9 and SPC are off and the buck-boost converter 436 and switch S10 are on.

Figure 5H:
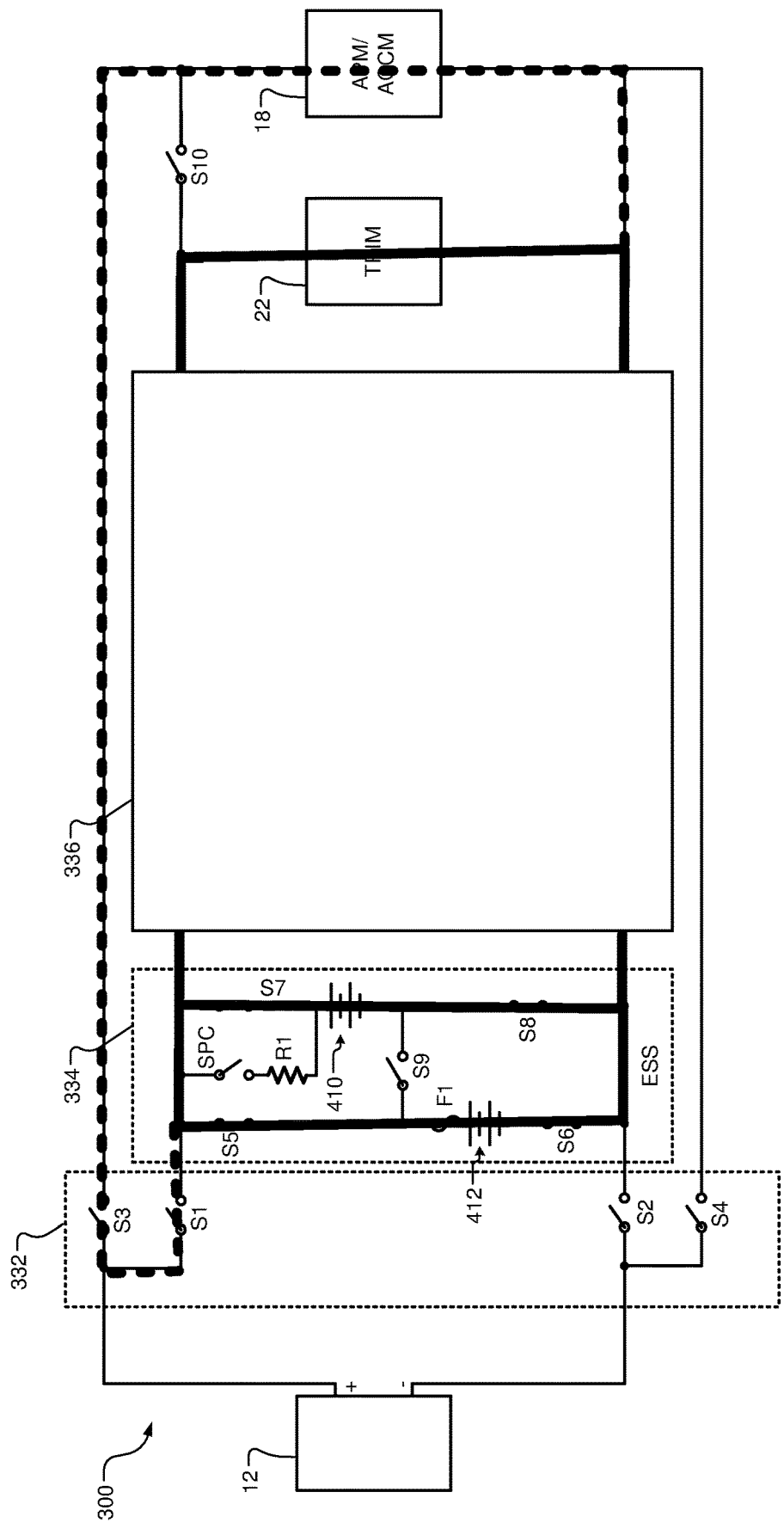

During battery preconditioning in FIGS. 5A and 5H, the switches S2, S4, S9, S10 and SPC are off, and the switches S5 to S8 and the buck-boost converter 436 are on. Switch S1 and S3 are on if vehicle load 18 is needed.

Figure 6:
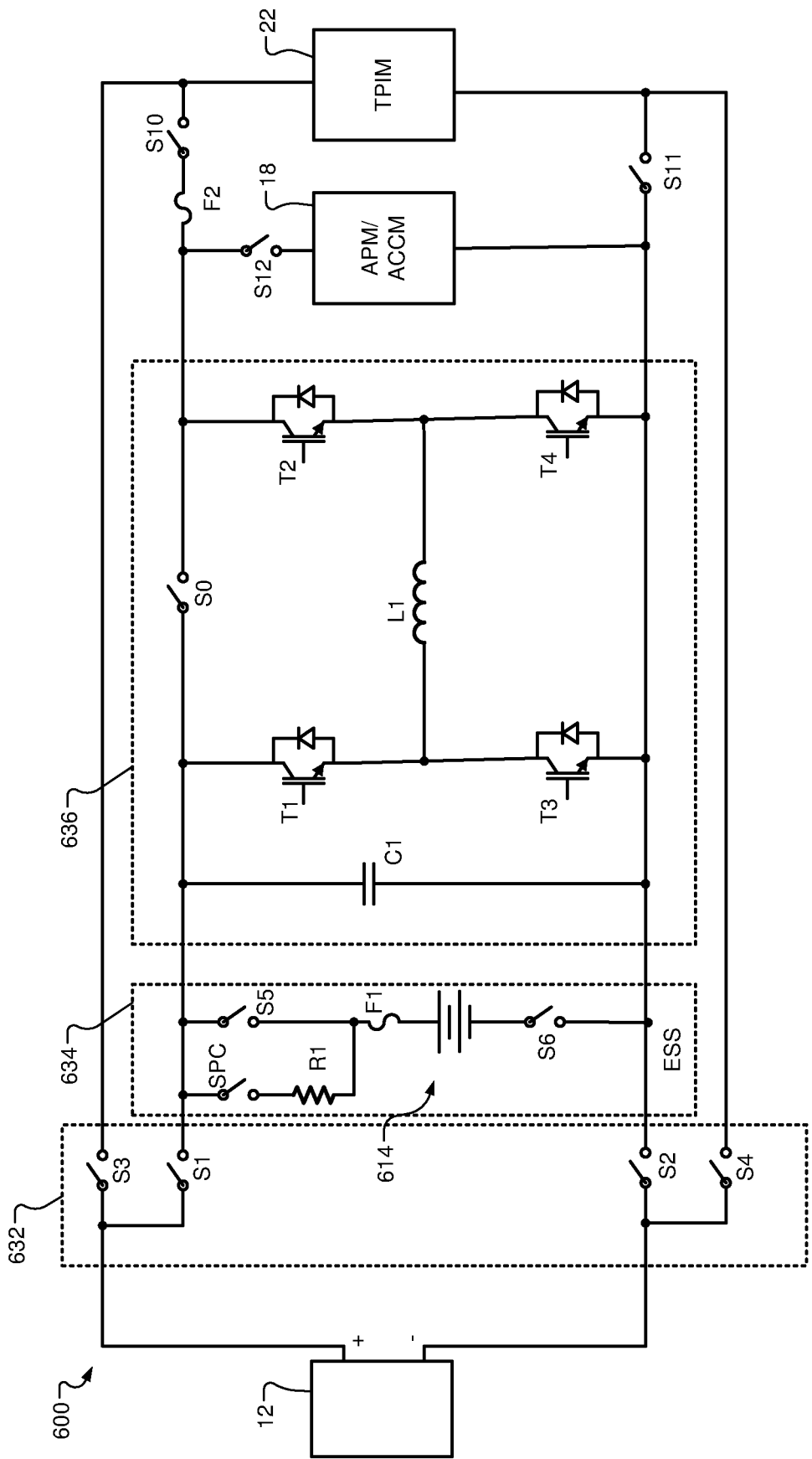
FIG. 6 is a functional block diagram of another example of a power control system for a battery system of a vehicle according to the present disclosure.

Referring now to FIG. 6, a power control system 600 is shown. In some examples, the power control system 600 includes an 800V drive system. The power control system 600 supports various modes including range improvement, accessory load support during driving and charging, charging from different grid voltages (e.g. 400V or 800V), vehicle-to-vehicle charging and/or battery preconditioning.

The power control system 600 includes the charge port 12 and provides power to the first vehicle loads 18, the second vehicle loads 22, and/or other loads. The power control system 600 further includes contactors 632, an energy storage system (ESS) 634, and a buck-boost converter 636. The contactors 632 include switches S1 and S3 having a first terminal connected to a positive terminal of the charge port 12. The contactors 632 further include switches S1 and S4 having first terminals connected to a negative terminal of the charge port 12.

The ESS 634 includes a battery pack 614 and switches SPC, S5 and S6. First terminals of the switches SPC and S5 are connected to a second terminal of the switch S1. A second terminal of the switch SPC is connected by a resistor R1 to a second terminal of the switch S5 and a first terminal of a fusible link F1. A second terminal of the fusible link F1 is connected to a positive terminal of the battery pack 614 including one or more battery cells. A negative terminal of the battery pack 614 is connected to a first terminal of a switch S6. A second terminal of the switch S6 is connected to a second terminal of the switch S2.

The buck-boost converter 636 includes a capacitor C1 having a first terminal connected to the first terminal of the switch S1 and a second terminal connected to the second terminal of the switch S2. A first terminal of a power switch T1 is connected to the second terminal of the switch S1 and a first terminal of a switch S0. A second terminal of the power switch T1 is connected to a first terminal of inductor L1 and a first terminal of a power switch T3. A second terminal of the power switch T3 is connected to the second terminal of the switch S2.

A second terminal of the switch S0 is connected to a first terminal of a power switch T2, a second terminal of the switch S3, a first terminal of a switch S12 and a first terminal of the fusible link F2. A second terminal of the power switch T2 is connected to a second terminal of the inductor L1 and a first terminal of a power switch T4. A second terminal of the power switch T4 is connected to the second terminal of the switch S2, a second terminal of the first vehicle loads 18, and a first terminal of a switch S11.

A second terminal of the fusible link F2 is connected to a first terminal of a switch S10. A second terminal of the switch S10 is connected to the second vehicle loads 22. A second terminal of the second vehicle loads 22 is connected to the second terminal of the switch S11 and a second terminal of the switch S4.

Referring now to FIG. 7, the positions of the switches during various operating modes are shown. In a normal driving mode, the switches S1, S3, S5, and S6 are on to provide power to TPIM 22 directly from battery, the switches S2, S4, S10, S11 and SPC are off and the buck-boost converter 636 and switch 12 are on to support accessory load 18.

In an accessory load support mode, the switches S1 to S4 and SPC are off and switches S5, S6, and S10 to S12 are on and the buck-boost converter 636 is on.

In a range improvement mode, the switches S1 to S4 and SPC are off, switches S5, S6, and S10 to S12 are on, and the buck-boost converter 636 is on.

In a pre-charging mode, the switches S3 to S5, S10 to S12 are off, switches S1, S2 S6, and SPC are on, and the buck-boost converter 636 is off.

When charging from a 400V grid, the switches S3 to S6, S10 and S11 are on, the switches S1, S2 and SPC are off and the buck-boost converter 636 and S12 are on support vehicle load 18.

When charging from an 800V grid, the switches S1, S2, S5 and S6 are on, the switches S3, S4, S10, S11 and SPC are off and the buck-boost converter 636 and S12 are on to support vehicle load 18.

When charging the ESS of a second vehicle at 400V, the switches S1, S2, and SPC are off and the switches S3 to S6, and S9 to S12 and the buck-boost converter 636 are on.

When charging the ESS of a second vehicle at 800V, the switches S1, S2, S12, and SPC are off and the switches S3 to S6, S10 and S11 are on, and the buck-boost converter 636 is on.

When performing battery preconditioning, the switches S1 to S4, S10 to S12 and SPC are off and the switches S5 and S6 and the buck-boost converter are on.

Figure 8:
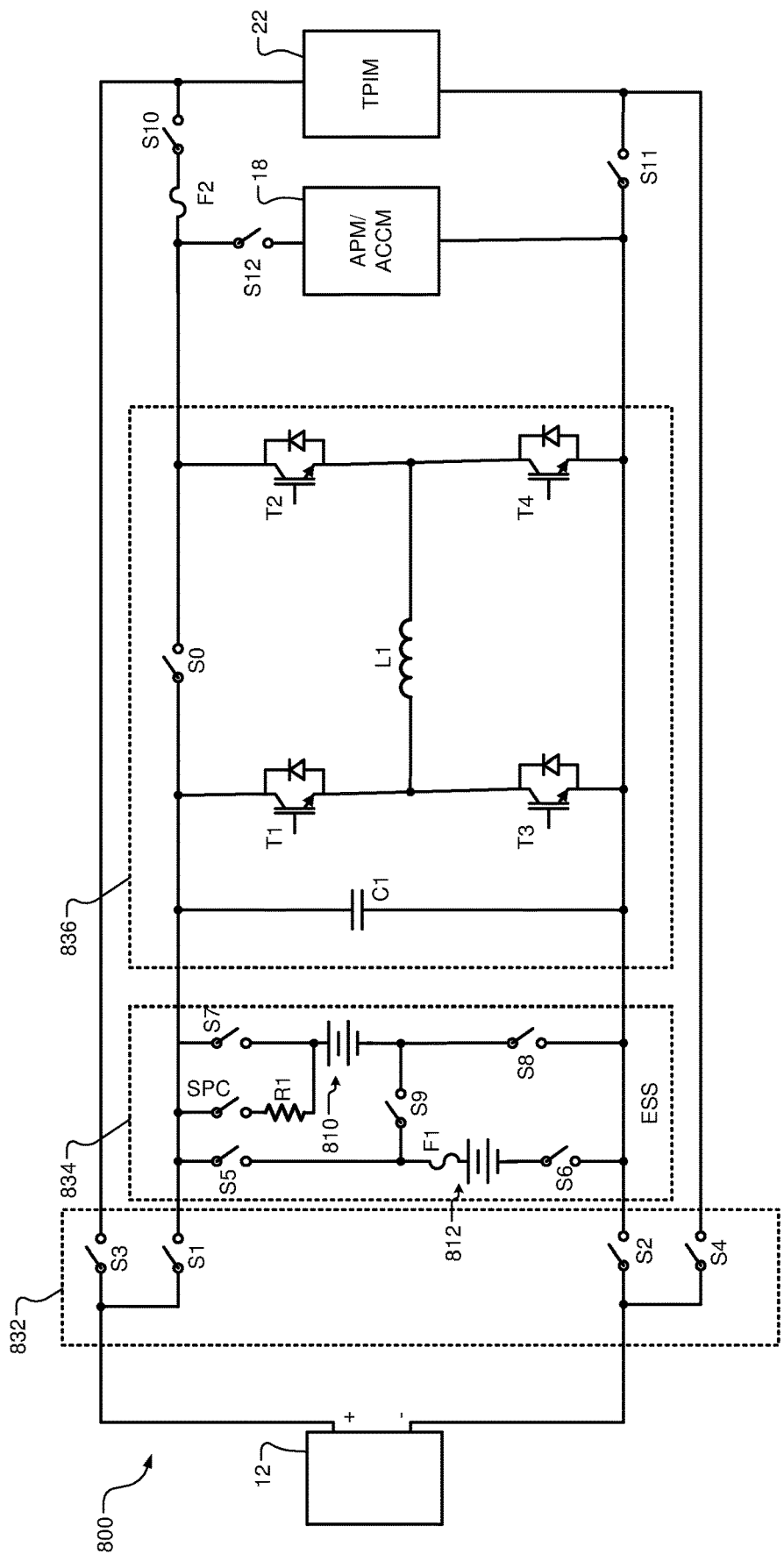
FIG. 8 is a functional block diagram of another example of a power control system for a battery system of a vehicle according to the present disclosure.

Referring now to FIG. 8, another power control circuit 800 is shown. In some examples, the power control circuit 800 is an 800V drive system with a flexible battery system including two battery packs. The power control circuit 800 supports various modes including range improvement, accessory load support during driving and charging, charging from different grid voltages (e.g. 400V or 800V), vehicle-to-vehicle charging and/or battery preconditioning.

The power control circuit 800 include the charge port 12 and supplies power to the second vehicle loads 22, the first vehicle loads 18 and/or other loads. The power control circuit 800 further includes contactors 832, an energy storage system (ESS) 834 (including a first battery pack 810 and a second battery pack 812), and a buck-boost converter 836.

First terminals of switches S1 and S3 are connected to a positive terminal of the charge port 12. First terminals of switches S2 and S4 are connected to a negative terminal of the charge port 12. First terminals of switches S5, S7 and SPC are connected to a second terminal of the switch S1. A second terminal of the switch S7 is connected by a resistor R1 to a second terminal of the switch SPC and to a first terminal of the first battery pack 810. A second terminal of the switch S5 is connected to a first terminal of the switch S9 and a first terminal of a fusible link F1. A second terminal of the switch S9 is connected to a second terminal of the first battery pack 810 and to a first terminal of a switch S8. A second terminal of the second battery pack 812 is connected to a first terminal of a switch S6. Second terminals of the switches S6 and S8 are connected to a second terminal of the switch S2.

The buck-boost converter 836 includes a capacitor C1 having a first terminal connected to the second terminal of the switch S1 and a second terminal connected to the second terminal of the switch S2. A first terminal of a power switch T1 is connected to the second terminal of the switch S1 and a first terminal of a switch S0. A second terminal of the power switch T1 is connected to a first terminal of an inductor L1 and a first terminal of a switch T3. A second terminal of the power switch T3 is connected to the second terminal of the switch S2.

A second terminal of the power switch T2 is connected to a second terminal of an inductor L1 and to a first terminal of a power switch T4. A second terminal of the power switch T4 is connected to the second terminal of the switch S2, a second terminal of the first vehicle loads 18, and a first terminal of the switch S11.

A second terminal of the switch S0 is connected to a first terminal of the power switch T2, a first terminal of a switch S12 and a first terminal of the fusible link F2. A second terminal of the fusible link F2 is connected to a first terminal of a switch S10. A second terminal of the switch S10 is connected to the second vehicle loads 22 and to a second terminal of the switch S3. A second terminal of the second vehicle loads 22 is connected to a second terminal of the switch S11 and a second terminal of the switch S4.

Referring now to FIG. 9, the power control circuit 400 operates in various operating modes. In a normal driving mode, the switches S1,S3, S6, S7, S9, and are on to provide power to TPIM 22 directly from battery, switches S2, S4, S5, S8, S10, S11 and SPC are off, and the buck-boost converter 836 and S12 are on to support accessory load 18.

In accessory load support mode, switches S1 to S5, S8 and SPC are off, switches S6, S7, S9 to S12 are on, and the buck-boost converter 836 is on.

In a range improvement mode, the switches S1 to S5, S8 and SPC are off, switches S6, S7, and S9 to S12 are on and the buck-boost converter 836 is on.

In a pre-charging mode, the switches S1 to S5, S7, S8, S10 to S12 are off, switches S6, S9 and SPC are on and the buck-boost converter 836 is off.

When charging from a 400 V grid, the switches S3, S4, S6, S7, and S9 to S12 are on, switches S1, S2, S5, S8 and SPC are off and the buck-boost converter 836 is on.

When charging from an 800V grid, the switches S1, S2, S6, S7, S9 and are on and switches S3, S4, S5, S8, S10, S11 and SPC are off and the buck-boost converter 836 and S12 are on to support accessory load 18.

When charging a second vehicle having a 400 V ESS, the switches S3, S4, S6, S7 and S9 to S12 are on, the switches S1, S2, S5, S8 and SPC are off and the buck-boost converter 836 is on to reduce voltage to 400V to charge second vehicle and support accessory load 18.

When charging a second vehicle having a 800 V ESS, the switches S3, S4, S6, S7 and S9 to S11 are on, the switches S1, S2, S5, S8,S12 and SPC are off and the buck-boost converter 836 is on to charge second vehicle.

During battery preconditioning, the switches S1 to S5, S8, S10 to S12 and SPC are off, the switches S6, S7, and S9 are on and the buck-boost converter 836 is on.

Figure 10:
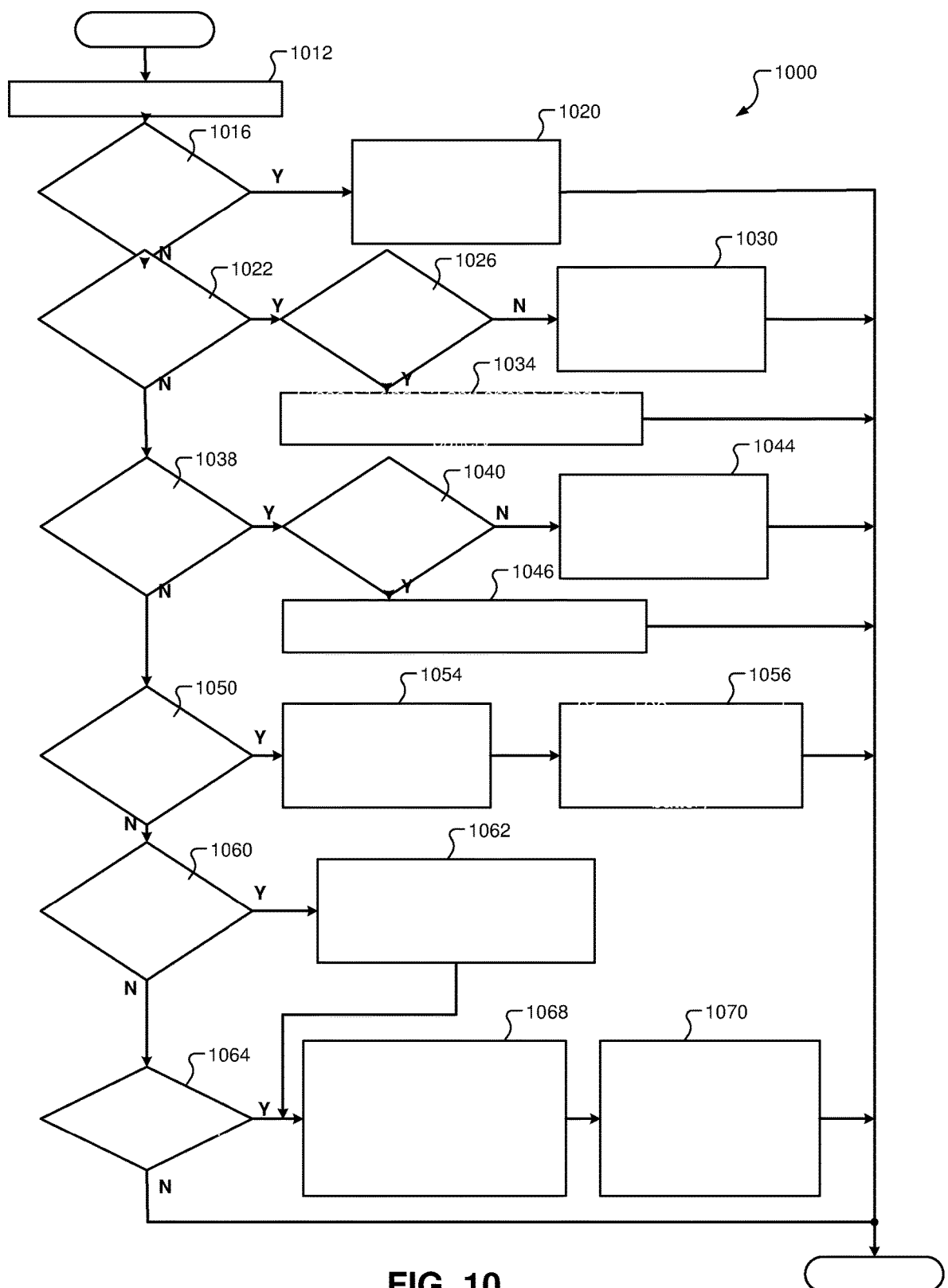
FIG. 10 is a flowchart of a method for operating the battery system according to the present disclosure.

Referring now to FIG. 10, a method 1000 for operating the battery system is shown. At 1012, the method determines the operating mode of the battery system. At 1016, the method determines whether the selected mode is the battery pre-conditioning mode. If 1016 is true, the method continues at 1020 and opens S1 to S4 and the buck-boost converter controls AC current to charge the battery pack(s).

If 1016 is false, the method continues at 1022 and determines whether the selected mode corresponds to charging from an 800 V grid. If 1022 is true, the method continues at 1026 and determines whether the vehicle has a 400 V charging system. If 1026 is false, the method continues at 1030 and closes switches S1 and S2 and opens switch S3 and S4. The battery pack(s) are directly charged from the grid. If 1026 is true, the method continues at 1034 and closes the switches S3 and S4 and opens the switches S1 and S2. The buck-boost converter reduces voltage for charging the battery. At the same time, for example, switches S9 and S10 in FIG. 1 are open to isolate the 400V system from 800V grid.

If 1022 is false, the method continues at 1038 and determines whether the charging system is charging from a 400 V grid. If 1038 is true, the method continues at 1040 where the method determines whether the vehicle has an 800 V system. If 1040 is false, the method continues at 1044 and closes switches S1 and S2 and opens switches S3 and S4. The battery pack(s) is (are) directly charge from the grid.

If 1040 is true, the method continues at 1046 and closes the switches S3 and S4 and opens the switches S1 and S2. The buck-boost converter boosts voltage for charging the battery pack(s).

If 1038 is false, the method continues at 1050 and determines whether vehicle-to-vehicle charging is selected. If 1050 is true, the method continues at 1054 and configures the ESS to either 400 V or 800V depending upon the voltage used by the battery pack(s) of the second vehicle. At 1056, the switches S1 and S2 are opened and the switches S3 and S4 are closed. The buck-boost converter controls current to charge the second vehicle battery pack. At the same time, if the vehicle is a 400V drive system and the charged vehicle is 800V, switches S9 and 510 in FIG. 1 are open to isolate the 400V system from another ESS with 800V. If 1050 is false, the method continues at 1060 and determines whether the range improvement mode is selected. It 1060 is true, the method continues at 1062 and opens switches S1 to S4 and S9 and closes switches S5 to S8. The buck-boost converter varies bus voltage to a predetermined optimal voltage.

If 1060 is false, the method continues at 1064 and determines whether normal operation mode is selected. If 1064 is true, the method continues at 1068. At 1068, switches S5 to S8 are closed, switch S9 is opened and the buck-boost converter is bypassed using either switch S0 or S1 to S4. The battery directly provides power to the drive system. At 1070, the motor controller controls torque commands Id and Iq based on voltage, torque and speed and then controls torque. If 1060 is false, the method continues at 1064 and determines whether the vehicle is operating in the normal operating mode. If 1064 is true, the method continues with 1068 and 1070 described above.

Figure 11:
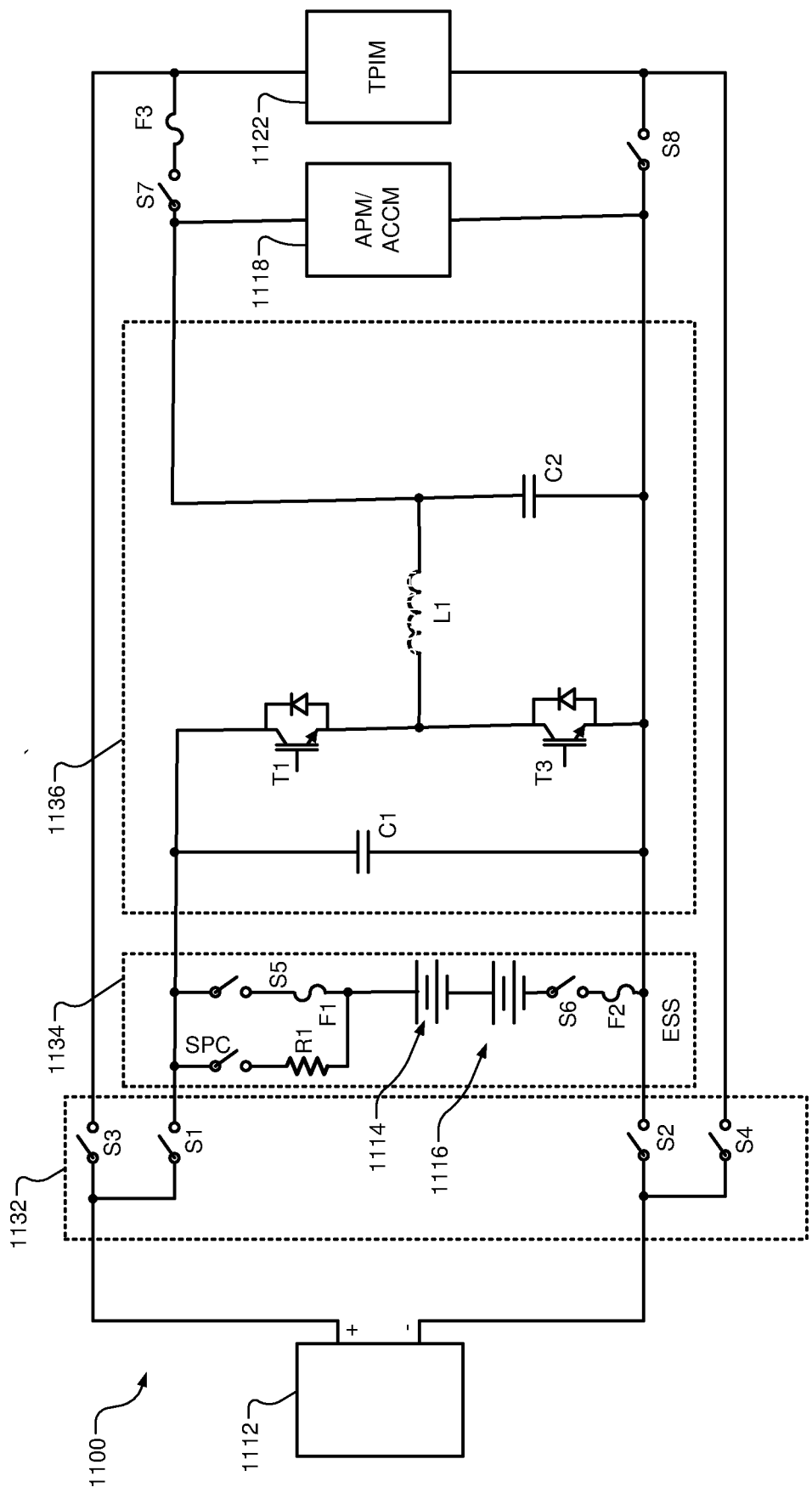
FIG. 11 is a functional block diagram of another example of a power control system for a battery system of a vehicle according to the present disclosure.

Referring now to FIG. 11, a power control circuit 1100 is shown. In some examples, the battery system is an 800V drive system, although other voltages can be used. The power control circuit 1100 includes a charge port 1112 and provides power to a first vehicle loads 1118 including a one or more sub-modules such as an accessory power module (APM) and/or air conditioning compressor module (ACCM) and second vehicle loads 1122 such as a traction power inverter module (TPIM), although other types of vehicle loads can be used. The power control circuit 1100 further includes contactors 1132, an energy storage system (ESS) 1134, and a bi-directional DC-DC converter 1136.

The contactors 1132 include switches S1 and S3 having a first terminal connected to a positive terminal of the charge port 1112. The contactors 1132 further include switches S2 and S4 having first terminals connected to a negative terminal of the charge port 1112.

The ESS 1134 includes first and second battery packs 1114 and 1116 and switches SPC, S5 and S6. The switch SPC is a pre-charge contactor. As can be appreciated, the switches can include mechanical relays and/or solid state switches. First terminals of the switches SPC and S5 are connected to a second terminal of the switch S1. A second terminal of the switch SPC is connected by a resistor R1 to a second terminal of the switch S5 and a first terminal of a fusible link F1 (such as a fuse or circuit breaker).

A second terminal of the fusible link F1 is connected to a positive terminal of the first battery pack 1114 that includes one or more battery cells. A negative terminal of the first battery pack 1114 is connected to a positive terminal of the second battery pack 1116. A negative terminal of the second battery pack is connected to a first terminal of a switch S6. A second terminal of the switch S6 is connected to a fusible link F2. The fusible link F2 is connected to a second terminal of the switch S2.

The bi-directional DC-DC converter 1136 includes a capacitor C1 having a first terminal connected to the first terminal of the switch S1 and a second terminal connected to the second terminal of the switch S2. A first terminal of a power switch T1 is connected to the second terminal of the switch S1. A second terminal of the power switch T1 is connected to a first terminal of an inductor L1 and a first terminal of a power switch T2. A second terminal of the power switch T2 is connected to the second terminal of the switch S2.

The bi-directional DC-DC converter 1136 further includes a capacitor C2 having a first terminal connected to a second terminal of the inductor L1, a first terminal of the first vehicle loads 1118 and a first terminal of a switch S7. A second terminal of the switch S7 is connected to a fusible link F3. The fusible link F3 is connected to a first terminal of second vehicle loads 1122 and a second terminal of the switch S3. A second terminal of the switch S8 is connected to a second terminal of the second vehicle loads 1122 and a second terminal of the switch S4.

In some examples, the power switches T1 to T2 may include voltage-controlled bipolar switching devices in the form of insulated gate bipolar transistors (IGBTs), metal-oxide semiconductor field effect transistors (MOSFETs), silicon carbide (SIC) MOSFET, wideband GaN devices (WBG), or other suitable switches having a control terminal to turn on and off.

Referring now to FIG. 12, the power control circuit 1100 operates in various operating modes. In a normal driving mode, the switches S1, S3, S5, S6 are on to provide power to TPIM 1122 directly from battery and the bi-directional DC-DC converter 1136 are on to support 400V accessory load 1118 and switches S7, S8, and SPC are off.

In a range improvement mode, the switches S5 to S8 and the bi-directional DC-DC converter 1136 are on to reduce voltage to low voltage, for example, 400V, and switches S1 to S4 and SPC are off.

In accessory load support mode, switches S1 to S4, S7, S8 and SPC are off and switches S5 and S6 and the bi-directional DC-DC converter 1136 are on.

In a pre-charging mode, the switches S1, S2, S6 and SPC are on and switches S3 to S5, S7 and S8 and the bi-directional DC-DC converter 1136 are off.

When charging from a 400 V grid, the switches S3 to S8 and the bi-directional DC-DC converter 1136 are on and switches S1, S2, and SPC are off.

When charging from an 800V grid, the switches S1, S2, S5, S6 and the bi-directional DC-DC converter 1136 are on to support 400V accessory load and switches S3, S4, S7, S8 and SPC are off.

When charging a second vehicle having a 400 V ESS, the switches S3 to S8 and the bi-directional DC-DC converter 1136 are on, the switches S1, S2, and SPC are off.

During battery preconditioning, the switches S1 to S4, S7, S8, and SPC are off, the switches S5, S6 and the bi-directional DC-DC converter 1136 are on.

As can be appreciated from the foregoing, the bidirectional DC-DC converter can be configured in different selectable modes such as range improvement, battery preconditioning, accessory load support, backward DC Fast Charge (DCFC) compatibility, V2X charging for a battery electric vehicle. The bidirectional converter functions as buck converter from battery point of view and provides function such as range improvement, battery pre-conditioning, accessory load support, and V2V charging.

The bidirectional DC-DC converter functions as boost converter if external source is provided. The bidirectional DC-DC converter functions such as backward DC Fast Charge (DCFC) compatibility, and V2V charging using 400V drive system.

For example for an 800V drive system, the architecture in FIG. 12 can simultaneously achieve range improvement, vehicle to vehicle charging, battery preconditioning, backward compatibility (400V charging for 800V battery).

Figure 13:
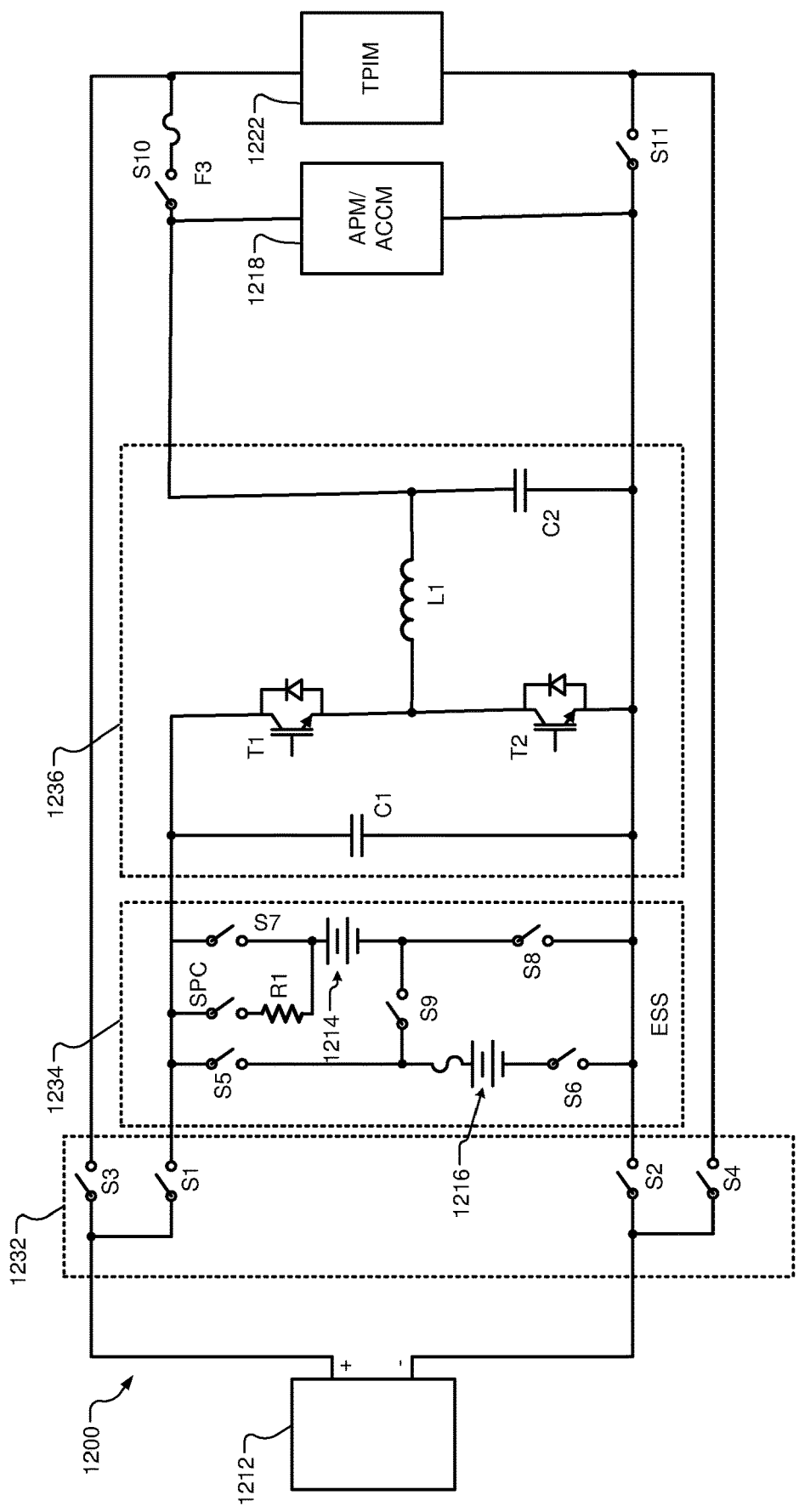
FIG. 13 is a functional block diagram of another example of a power control system for a battery system of a vehicle according to the present disclosure.

Referring now to FIG. 13, a power control system 1200 is shown. In some examples, the power control system 1200 is an 800V drive system, although other voltages can be used. The power control system 1200 includes a charge port 1212 and provides power to a first vehicle loads 1218 including a one or more sub-modules accessory power module (APM) and/or air conditioning compressor module (ACCM) and second vehicle loads 1222 such as a traction power inverter module (TPIM), although other types of vehicle loads can be used. The power control system 1200 further includes contactors 1232, an energy storage system (ESS) 1234, and a bidirectional DC-DC converter 1236.

The contactors 1232 include switches S1 and S3 having a first terminal connected to a positive terminal of the charge port 1212. The contactors 1232 further include switches S2 and S4 having first terminals connected to a negative terminal of the charge port 1212.

The ESS 1234 includes first and second battery packs 1214 and 1216 and switches SPC, S5, S6, S7, S8 and S9. The switch SPC is a pre-charge contactor. As can be appreciated, the switches can include mechanical relays and/or solid state switches. First terminals of the switches SPC, S5 and S7 are connected to a second terminal of the switch S1. A second terminal of the switch SPC is connected by a resistor R1 to a second terminal of the switch S7 and a first terminal of the first battery pack 1214. A second terminal of the first battery pack is connected to a first terminal of a switch S9 and a first terminal of a switch S8. A second terminal of the switch S5 is connected to a fusible link F1 and a second terminal of a switch S9. The fusible link F1 is connected to a positive terminal of the second battery pack 1216. A negative terminal of the second battery pack 1216 is connected to a first terminal of a switch S6. Second terminals of the switches S6 and S8 are connected to the second terminal of the second switch S2.

The bidirectional DC-DC converter 1236 includes a capacitor C1 having a first terminal connected to the first terminal of the switch S1 and a second terminal connected to the second terminal of the switch S2. A first terminal of a power switch T1 is connected to the second terminal of the switch S1. A second terminal of the power switch T1 is connected to a first terminal of an inductor L1 and a first terminal of a power switch T2. A second terminal of the power switch T2 is connected to the second terminal of the switch S2.

The bidirectional DC-DC converter 1236 further includes a capacitor C2 having a first terminal connected to a second terminal of the inductor L1, a first terminal of the first vehicle loads 1218 and a first terminal of a switch S10. A second terminal of the switch S10 is connected to a fusible link F3. The fusible link F3 is connected to a first terminal of second vehicle loads 1222 and a second terminal of the switch S3. A first terminal of the switch S11 is connected to the second terminal of the capacitor C2, the second terminal of the power switch T2, and second terminals of the switches S2, S6, and S8. A second terminal of the switch S11 is connected to a second terminal of the second vehicle loads 1222 and a second terminal of the switch S4.

In some examples, the power switches T1 to T2 may include voltage-controlled bipolar switching devices in the form of insulated gate bipolar transistors (IGBTs), metal-oxide semiconductor field effect transistors (MOSFETs), silicon carbide MOSFETS, wideband GaN devices (WBG), or other suitable switches having a control terminal to turn on and off.

Referring now to FIG. 14, the power control system 1200 operates in various operating modes. In a normal driving mode, the switches S1, S3, S6, S7 and S9 are on to provide power directly from battery. The bidirectional DC-DC converter 1236 is on to support accessory load and switches S2, S4, S5, S8, S10, S11 and SPC are off.

In a range improvement mode, the switches S6, S7, S9, S10, S11 and the bi-directional DC-DC converter 1236 are on and switches S1 to S5, S8 and SPC are off.

In accessory load support mode, switches S1 to S5, S8 and SPC are off and switches S6, S7, S9 to S11 and the bi-directional DC-DC converter 1236 are on.

In a pre-charging mode, the switches S1, S2, S6, S9 and SPC are on and switches S3 to S5, S7, S8, S10, S11 and the bi-directional DC-DC converter 1236 are off.

When charging from a 400 V grid, the switches S3, S4, S6, S7, S9, S10, S11 and the bi-directional DC-DC converter 1236 are on and switches S1, S2, S5, S8 and SPC are off.

When charging from an 800V grid, the switches S1, S2, S6, S7, and S9 are on to charge the battery. The bi-directional DC-DC converter 1136 is on to support 400V accessory load 1218 and switches S3, S4, S5, S8, S10, S11 and SPC are off.

When charging a second vehicle having a 400 V ESS, the switches S3, S4, S6, S7, S9-S11 and the bi-directional DC-DC converter 1236 are on, the switches S1, S2, S5, S8 and SPC are off.

During battery preconditioning, the switches S1 to S5, S8, S10, S11 and SPC are off, the switches S6, S7, S9 and the bi-directional DC-DC converter 1236 are on.

For example for an 800V drive system with a flexible battery configuration, the architecture in FIG. 13 can simultaneously achieve range improvement, vehicle to vehicle charging, battery preconditioning, and 400V accessory load support during 800V charging.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A power control system for a vehicle, comprising:
a charge port;
a contactor connected to the charge port and including a first plurality of switches;
an energy storage system including a second plurality of switches and one or more battery packs;
a bi-directional DC-DC converter connected between the energy storage system and a plurality of vehicle loads; and
a controller configured to control states of the first plurality of switches and the second plurality of switches to configure in a plurality of modes including:
a range improvement mode;
a first charging mode to perform charging at a first voltage level, wherein the one or more battery packs supply power at the first voltage level;
a vehicle to vehicle charging mode;
a second charging mode to perform charging at a second voltage level that is different than the first voltage level;
a battery preconditioning mode; and
an accessory load support mode that is operable:
during charging at a higher one of the first voltage level and the second voltage level; and
during operation at a higher one of the first voltage level and the second voltage level.

2. The power control system of claim 1, wherein the first plurality of switches of the contactor includes:
a first switch including a first terminal connected to a first terminal of the charge port, a second terminal connected to a first terminal of the energy storage system and a control terminal connected to the controller;
a second switch including a first terminal connected to a second terminal of the charge port, a second terminal connected to a second terminal of the energy storage system and a control terminal connected to the controller;
a third switch including a first terminal connected to the first terminal of the charge port, a second terminal connected to a first terminal of a first one of the plurality of vehicle loads and a control terminal connected to the controller; and
a fourth switch including a first terminal connected to the second terminal of the charge port, a second terminal connected to a second terminal of the first one of the plurality of vehicle loads and a control terminal connected to the controller.

3. The power control system of claim 2, wherein the bi-directional DC-DC converter includes:
a first capacitor including a first terminal connected to the second terminal of the first switch and a second terminal connected to the second terminal of the second switch;
a first power switch including a first terminal connected to the second terminal of the first switch;
an inductor including a first terminal and a second terminal;
a second power switch including a first terminal connected to a second terminal of the first power switch and the first terminal of the inductor, and a second terminal connected to the second terminal of the second switch; and
a second capacitor including a first terminal connected to the second terminal of the inductor and the first one of the plurality of vehicle loads, and a second terminal connected to the second terminal of the second switch.

4. The power control system of claim 3, further comprising:
a fifth switch including a first terminal connected to the second terminal of the inductor, the first terminal of the second capacitor, and the first one of the plurality of vehicle loads;
a fusible link including a first terminal connected to a second terminal of the fifth switch and a second terminal connected to a second one of the plurality of vehicle loads and the second terminal of the third switch; and
a sixth switch including a first terminal connected to the second terminal of the second capacitor and the first one of the plurality of vehicle loads and a second terminal connected to the second one of the plurality of vehicle loads and the second terminal of the fourth switch.

5. The power control system of claim 2, wherein the energy storage system includes:
a fifth switch of the second plurality of switches including a first terminal connected to the second terminal of the first switch;

a sixth switch of the second plurality of switches including a first terminal connected to the second terminal of the first switch;

a first fusible link including a first terminal connected to a second terminal of the sixth switch;

a first battery pack of the one or more battery packs including a first terminal and a second terminal;

a second battery pack of the one or more battery packs including a first terminal and a second terminal;

a resistor including a first terminal connected to a second terminal of the fifth switch and a second terminal connected to a second terminal of the first fusible link and the first terminal of the first battery pack, wherein the first terminal of the second battery pack is connected to the second terminal of the first battery pack;

a seventh switch of the second plurality of switches including a first terminal connected to the second terminal of the second battery pack; and a second fusible link including a first terminal connected to a second terminal of the seventh switch and a second terminal connected to the second terminal of the second switch.

6. The power control system of claim 2, wherein the energy storage system includes:

a fifth switch of the second plurality of switches including a first terminal connected to the second terminal of the first switch;

a sixth switch of the second plurality of switches including a first terminal connected to the second terminal of the first switch;

a first battery pack of the one or more battery packs including a first terminal and a second terminal;

a resistor including a first terminal connected to a second terminal of the fifth switch and a second terminal connected to a second terminal of the sixth switch and the first terminal of the first battery pack;

a seventh switch of the second plurality of switches including a first terminal connected to the second terminal of the first switch;

an eighth switch of the second plurality of switches including a first terminal connected to a second terminal of the seventh switch and a second terminal connected to the second terminal of the first battery pack;

a second battery pack of the one or more battery packs including a first terminal and a second terminal;

a fusible link including a first terminal connected to the second terminal of the seventh switch and the first terminal of the eighth switch and a second terminal connected to the first terminal of the second battery pack;

a ninth switch of the second plurality of switches including a first terminal connected to the second terminal of the second battery pack and a second terminal connected to the second terminal of the second switch; and a tenth switch of the second plurality of switches including a first terminal connected to the second terminal of the first battery pack and a second terminal connected to the second terminal of the second switch.

7. The power control system of claim 2, wherein the bi-direction DC-DC converter includes:

a capacitor connected to the second terminal of the first switch and the second terminal of the second switch;

a first power switch, a second power switch, a third power switch and a fourth power switch each including a first terminal, a second terminal and a control terminal; and an inductor, wherein the first terminal of the first power switch is connected to the second terminal of the first switch, wherein the second terminal of the first power switch is connected to the first terminal of the third power switch and a first terminal of the inductor, wherein the first terminal of the second power switch is connected to a first node, wherein the second terminal of the second power switch is connected to a second terminal of the inductor and a first terminal of the fourth power switch, and wherein the second terminal of the fourth power switch is connected a second node.

8. The power control system of claim 7, further comprising:

a fifth switch including a first terminal connected to the first node and a second terminal connected first terminals of the vehicle loads; and a sixth switch including a first terminal connected to the second node and a second terminal connected to second terminals of the vehicle loads.

9. The power control system of claim 7, further comprising a fifth switch, wherein:

the plurality of vehicles loads include a first vehicle load and a second vehicle load, the first node is connected a first terminal of the first vehicle load and a first terminal of the fifth switch, a second terminal of the fifth switch is connected to a first terminal of the second vehicle load; and the second node is connected to a second terminal of the first vehicle load and the second vehicle load.

10. The power control system of claim 7, further comprising:

a fusible link;

a fifth switch including a first terminal and a second terminal; and a sixth switch including a first terminal and a second terminal, wherein:

the plurality of vehicles loads include a first vehicle load and a second vehicle load, the first node is connected a first terminal of the first vehicle loads and a first terminal of the fusible link, a second terminal of the fusible link is connected to a first terminal of the fifth switch, a second terminal of the fifth switch is connected to a second terminal of the third switch and first terminals of the second vehicle load, the second node is connected to a first terminal of the first vehicle load and a first terminal of the sixth switch, and a second terminal of the second switch is connected to a second terminal of the second vehicle load and the second terminal of the fourth switch.

11. A power control system for a vehicle, comprising:

a charge port;

a contactor connected to the charge port and including a first plurality of switches;

an energy storage system including a second plurality of switches and one or more battery packs;

a bi-directional DC-DC converter connected between the energy storage system and a plurality of vehicle loads; and a controller configured to control states of the first plurality of switches and the second plurality of switches to configure in a plurality of modes, wherein the first plurality of switches comprises:

a first switch including a first terminal connected to a first terminal of the charge port, a second terminal connected to a first terminal of the energy storage system and a control terminal connected to the controller;
a second switch including a first terminal connected to a second terminal of the charge port, a second terminal connected to a second terminal of the energy storage system and a control terminal connected to the controller;
a third switch including a first terminal connected to the first terminal of the charge port, a second terminal connected to a first terminal of a first one of the plurality of vehicle loads and a control terminal connected to the controller; and
a fourth switch including a first terminal connected to the second terminal of the charge port, a second terminal connected to a second terminal of the first one of the plurality of vehicle loads and a control terminal connected to the controller.

12. The power control system of claim 11, wherein the plurality of modes include:
a range improvement mode;
a first charging mode to perform charging at a first voltage level, wherein one or more battery packs supply power at the first voltage level;
a vehicle to vehicle charging mode;
a second charging mode to perform charging at a second voltage level that is less than the first voltage level;
a battery preconditioning mode; and
an accessory load support mode that is operable:
during charging at a higher one of the first voltage level and the second voltage level; and
when operating at a higher one of the first voltage level and the second voltage level.

13. The power control system of claim 11, wherein the bi-directional DC-DC converter includes:
a first capacitor including a first terminal connected to the second terminal of the first switch and a second terminal connected to the second terminal of the second switch;
a first power switch including a first terminal connected to the second terminal of the first switch;
an inductor including a first terminal and a second terminal;
a second power switch including a first terminal connected to a second terminal of the first power switch and the first terminal of the inductor, and a second terminal connected to the second terminal of the second switch; and
a second capacitor including a first terminal connected to the second terminal of the inductor and a first one of the vehicle loads, and a second terminal connected to the second terminal of the second switch.

14. The power control system of claim 13, further comprising:
a fifth switch including a first terminal connected to the second terminal of the inductor, the first terminal of the second capacitor, and the first one of the plurality of vehicle loads;
a fusible link including a first terminal connected to a second terminal of the fifth switch and a second terminal connected to a second one of the plurality of vehicle loads and the second terminal of the third switch; and
a sixth switch including a first terminal connected to the second terminal of the second capacitor and the first one of the plurality of vehicle loads and a second terminal connected to the second one of the plurality of vehicle loads and the second terminal of the fourth switch.

15. The power control system of claim 13, wherein the energy storage system includes:
a fifth switch of the second plurality of switches including a first terminal connected to the second terminal of the first switch;
a sixth switch of the second plurality of switches including a first terminal connected to the second terminal of the first switch;
a first fusible link including a first terminal connected to a second terminal of the sixth switch;
a first battery pack of the one or more battery packs including a first terminal and a second terminal;
a second battery pack of the one or more battery packs including a first terminal and a second terminal;
a resistor including a first terminal connected to a second terminal of the fifth switch and a second terminal connected to a second terminal of the first fusible link and the first terminal of the first battery pack, wherein the first terminal of the second battery pack is connected to the second terminal of the first battery pack;
a seventh switch of the second plurality of switches including a first terminal connected to the second terminal of the second battery pack; and
a second fusible link including a first terminal connected to a second terminal of the seventh switch and a second terminal connected to the second terminal of the second switch.

16. The power control system of claim 13, wherein the energy storage system includes:
a fifth switch of the second plurality of switches including a first terminal connected to the second terminal of the first switch;
a sixth switch of the second plurality of switches including a first terminal connected to the second terminal of the first switch;
a first battery pack of the one or more battery packs including a first terminal and a second terminal;
a resistor including a first terminal connected to a second terminal of the fifth switch and a second terminal connected to a second terminal of the sixth switch and the first terminal of the first battery pack;
a seventh switch of the second plurality of switches including a first terminal connected to the second terminal of the first switch;
an eighth switch of the second plurality of switches including a first terminal connected to a second terminal of the seventh switch and a second terminal connected to the second terminal of the first battery pack;
a second battery pack of the one or more battery packs including a first terminal and a second terminal;
a fusible link including a first terminal connected to the second terminal of the seventh switch and the first terminal of the eighth switch and a second terminal connected to the first terminal of the second battery pack;
a ninth switch of the second plurality of switches including a first terminal connected to the second terminal of the second battery pack and a second terminal connected to the second terminal of the second switch; and
a tenth switch of the second plurality of switches including a first terminal connected to the second terminal of the first battery pack and a second terminal connected to the second terminal of the second switch.

17. The power control system of claim 11, wherein the bi-direction DC-DC converter includes:
- a capacitor connected to the second terminal of the first switch and the second terminal of the second switch;
- a first power switch, a second power switch, a third power switch and a fourth power switch each including a first terminal, a second terminal and a control terminal; and
- an inductor,
- wherein the first terminal of the first power switch is connected to the second terminal of the first switch,
- wherein the second terminal of the first power switch is connected to the first terminal of the third power switch and a first terminal of the inductor,
- wherein the first terminal of the second power switch is connected to a first node,
- wherein the second terminal of the second power switch is connected to a second terminal of the inductor and a first terminal of the fourth power switch, and
- wherein the second terminal of the fourth power switch is connected a second node.

18. The power control system of claim 17, further comprising:
- a fifth switch including a first terminal connected to the first node and a second terminal connected first terminals of the vehicle loads; and
- a sixth switch including a first terminal connected to the second node and a second terminal connected to second terminals of the vehicle loads.

19. The power control system of claim 17, further comprising a fifth switch, wherein:
- the plurality of vehicles loads include a first vehicle load and a second vehicle load,
- the first node is connected a first terminal of the first vehicle load and a first terminal of the fifth switch,
- a second terminal of the fifth switch is connected to a first terminal of the second vehicle load; and
- the second node is connected to a second terminal of the first vehicle load and the second vehicle load.

20. The power control system of claim 17, further comprising:
- a fusible link;
- a fifth switch including a first terminal and a second terminal; and
- a sixth switch including a first terminal and a second terminal, wherein:
- the plurality of vehicle loads include a first vehicle load and a second vehicle load,
- the first node is connected a first terminal of the first vehicle load and a first terminal of the fusible link,
- a second terminal of the fusible link is connected to a first terminal of the fifth switch,
- a second terminal of the fifth switch is connected to a second terminal of the third switch and first terminals of the second vehicle load,
- the second node is connected to a first terminal of the first vehicle load and a first terminal of the sixth switch, and
- a second terminal of the second switch is connected to a second terminal of the second vehicle load and the second terminal of the fourth switch.

* * * * *